United States Patent [19]

Nishi et al.

[11] Patent Number: 4,731,742

[45] Date of Patent: Mar. 15, 1988

[54] VIDEO DISPLAY CONTROL SYSTEM

[75] Inventors: Kazuhiko Nishi; Takatoshi Ishii; Ryozo Yamashita, all of Tokyo; Shigemitsu Yamaoka, Hamamatsu; Takatoshi Okumura, Hamamatsu; Minoru Morimoto, Hamamatsu, all of Japan

[73] Assignees: Ascii Corporation, Tokyo; Nippon Gakki Seizo Kabushiki Kaisha, Hamamatsu, both of Japan

[21] Appl. No.: 712,253

[22] Filed: Mar. 15, 1985

[30] Foreign Application Priority Data

| | | | |
|---|---|---|---|
| Mar. 16, 1984 | [JP] | Japan | 59-050253 |
| Mar. 16, 1984 | [JP] | Japan | 59-050254 |
| Mar. 16, 1984 | [JP] | Japan | 59-050251 |
| Mar. 16, 1984 | [JP] | Japan | 59-050252 |
| Apr. 11, 1984 | [JP] | Japan | 59-072542 |
| Apr. 11, 1984 | [JP] | Japan | 59-072541 |

[51] Int. Cl.[4] .................... G06F 3/153

[52] U.S. Cl. .................... 364/521; 340/703; 340/747

[58] Field of Search .................... 364/518, 521; 340/701, 340/703, 707, 724, 731, 747, 750; 358/9, 16, 75, 77, 80, 903

[56] References Cited

U.S. PATENT DOCUMENTS

| | | | |
|---|---|---|---|
| 4,243,984 | 1/1981 | Ackley et al. | 340/703 |
| 4,262,302 | 4/1981 | Sexton | 358/10 |
| 4,286,320 | 8/1981 | Ott | 364/200 |
| 4,374,395 | 2/1983 | Herrmann et al. | 358/22 |
| 4,387,406 | 6/1983 | Ott | 358/310 |
| 4,564,915 | 1/1986 | Evans et al. | 364/521 |
| 4,598,384 | 7/1986 | Shaw et al. | 364/521 X |

*Primary Examiner*—Gary V. Harkcom
*Assistant Examiner*—H. R. Herndon
*Attorney, Agent, or Firm*—Cushman, Darby & Cushman

[57] ABSTRACT

A video display control system for displaying a video image on a screen of a video display unit. This video display control system basically comprises a VRAM (video RAM) and a video display processor (VDP). The VRAM has memory locations corresponding to display elements on the screen. The VDP includes a first register for receiving area information identifying a display area on the screen, an address generator for generating addresses of memory locations corresponding to the display area in accordance with the area information, and a memory accessing circuit for accessing the memory locations having the addresses. Therefore, the memory accessing operation through this VDP does not need a complicated support by a central processing unit. The VDP further comprises a second register for storing a color code supplied from an external device or read from the VRAM. Through this second register, the memory accessing circuit performs a memory accessing operation such as a transfer of color code between the external device and the VRAM, whereby color painting on a display area such as a rectangular area, dot and a line can easily be achieved. The VDP further comprises an operation circuit for effecting a certain operation on a color code in the second register and a color code in the VRAM and generating a new color code in accordance with the operation result. The operation-related color change on a display area can be achieved by storing the new color code in a corresponding memory location of the VRAM.

52 Claims, 53 Drawing Figures

FIG. 8 (a)
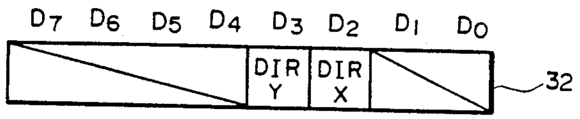
FIG. 8 (b)
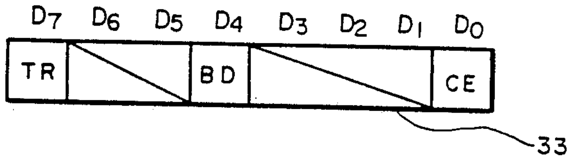
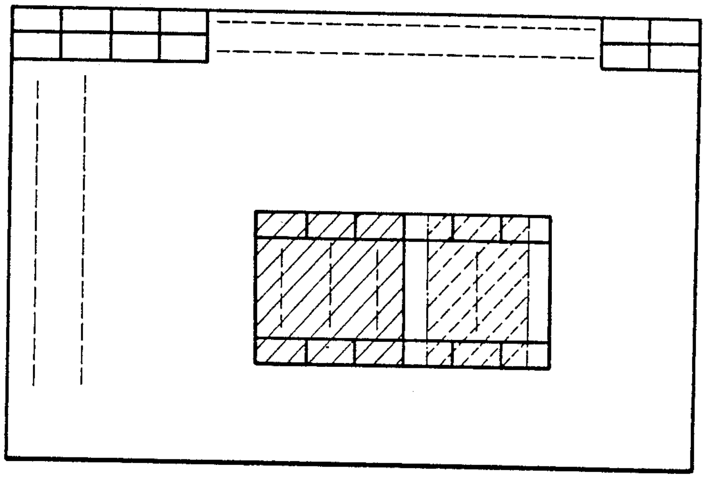
FIG. 10
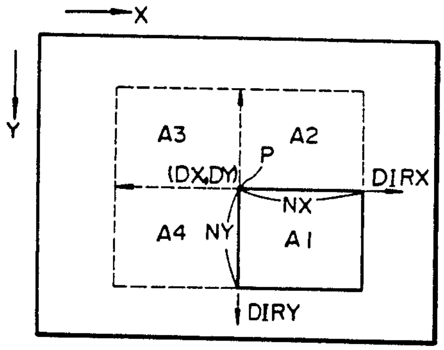
FIG. 12

G IV

G V

G VI

G VII

FIG.18 (a) GIV (GVI)
FIG.18 (b) GV
FIG.18 (c) GVII
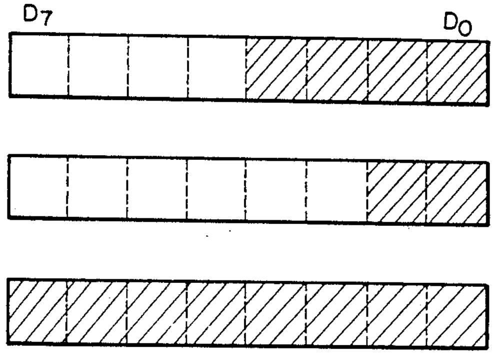
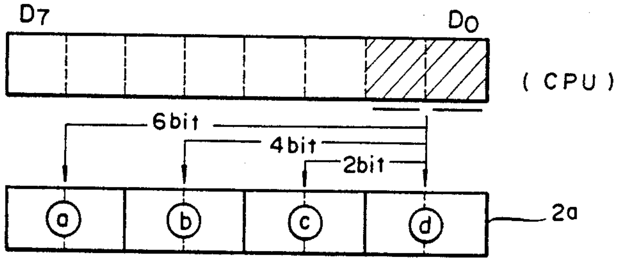
FIG.19
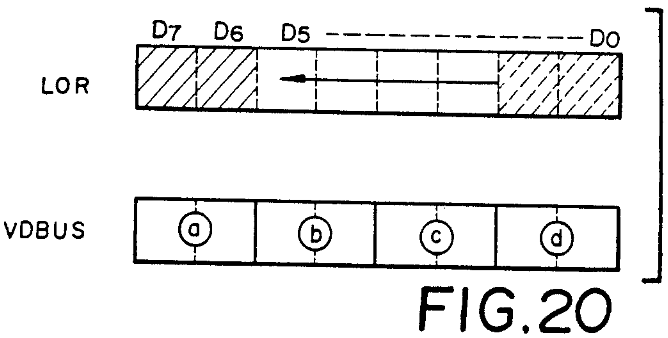
FIG.20

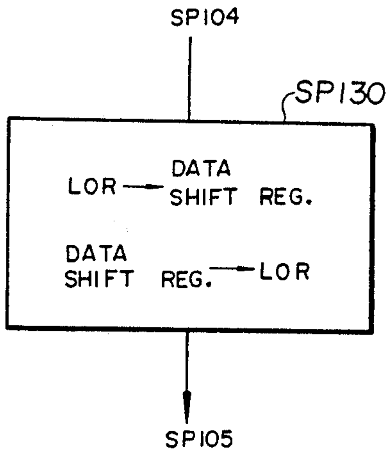
FIG.21
FIG.22
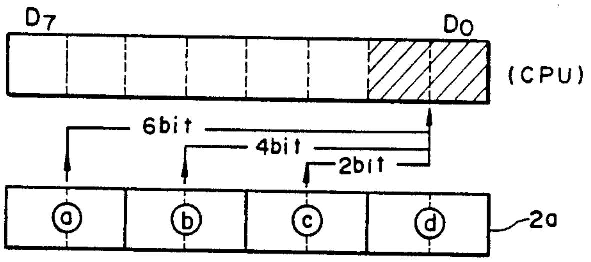
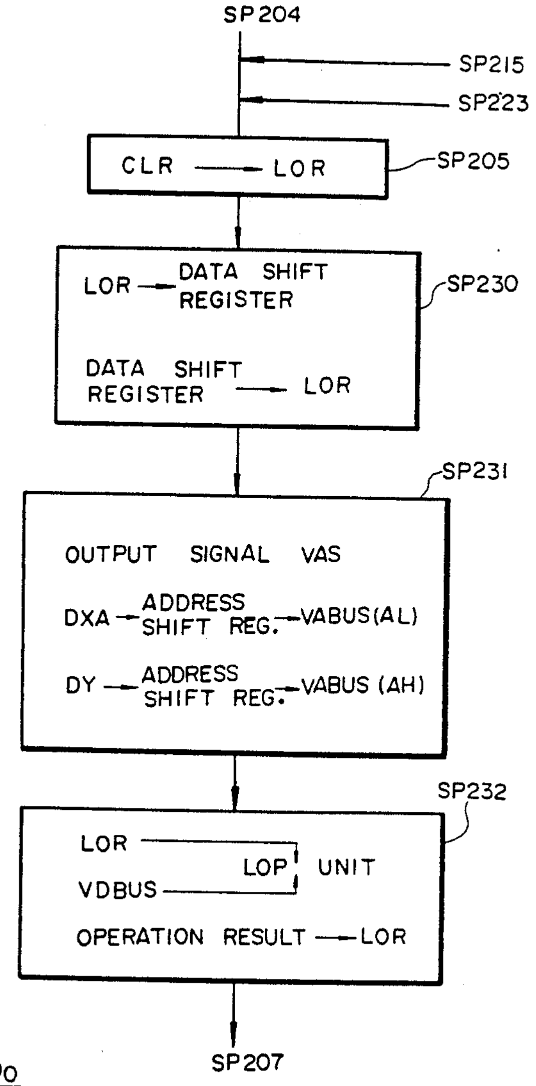
FIG.23

FIG. 26 (a)
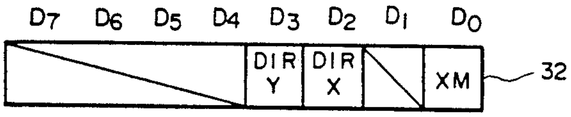
FIG. 26 (b)
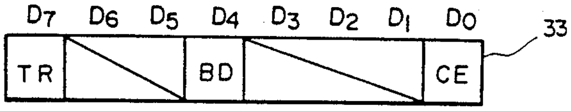
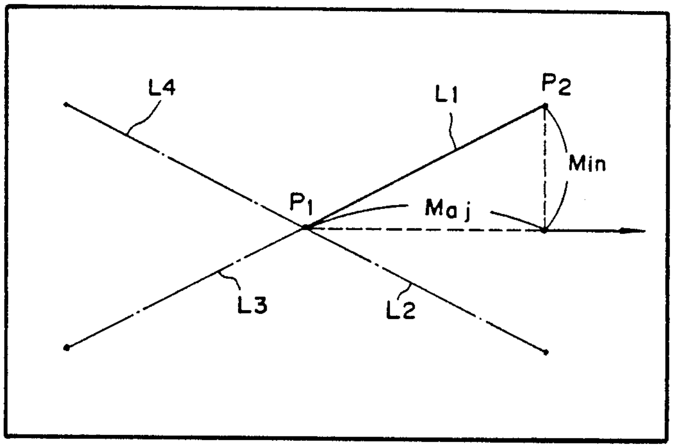
FIG. 27
FIG. 28
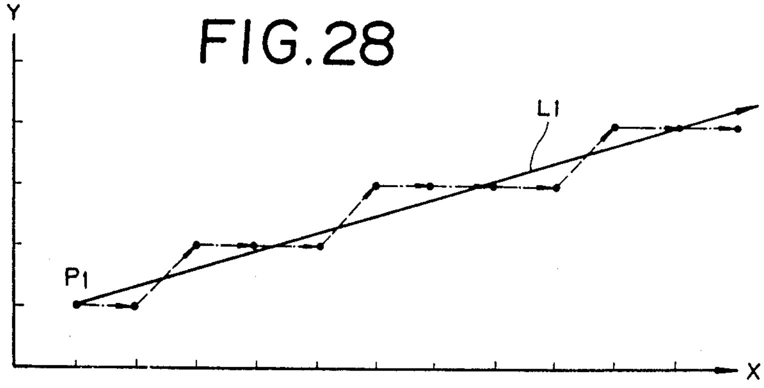

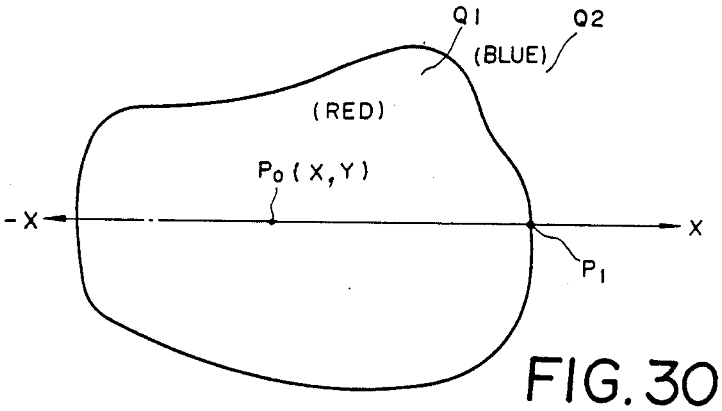
FIG. 30
FIG. 31 (a)
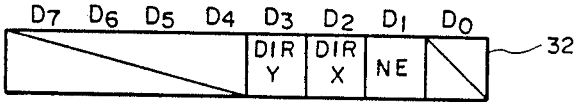
FIG. 31 (b)
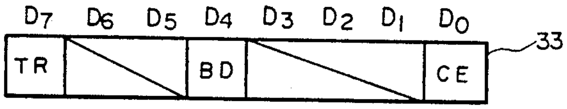
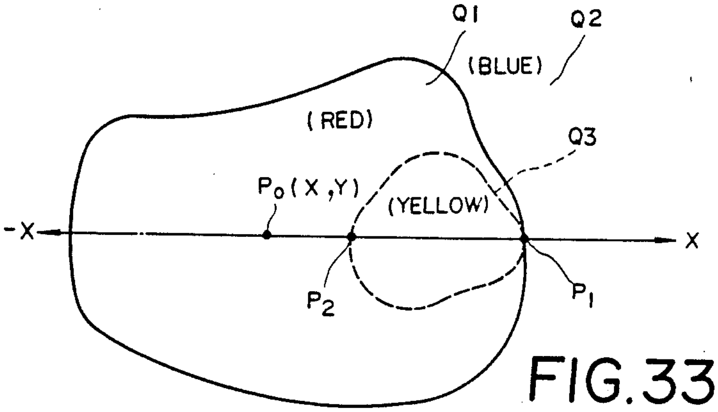
FIG. 33

VIDEO DISPLAY CONTROL SYSTEM

BACKGROUND OF THE INVENTION

1. Field of the Invention

This invention relates to a video display control system adapted to be connected to a video display unit such as a video monitor for displaying a video image on a screen of the video display unit.

2. Prior Art

In recent years, video display control systems capable of displaying both of still and animation pattern images on a screen of a video display unit have been extensively used in graphic video display apparatuses such as video game machines. One example of such conventional systems is shown in U.S. Pat. No. 4,286,320. This conventional system comprises a video data memory with an auto-incrementing address counter which automatically increments the contents thereof when a transfer of data is effected between a central processing unit and the video data memory. However, with this conventional system, when it is required to transfer a block of video data which represent, for example, an image composed of a plurality of rows of display elements in an area on the screen, the address count must be preset to an address corresponding to the first display element of the next row each time a transfer of video data of the current row is completed. A program to be executed by the central unit to implement the above procedure is fairly complicated. Furthermore, the address data to be outputted from the central processing unit is not a data indicative of the position of the display element on the screen but is a data indicative of an actual address or a memory location in the video data memory. Thus, it is rather difficult to recognize the position of a dot on the screen from the address data outputted from the central processing unit to display it. And, if such data indicative of the position of display element on the screen is used, it is necessary for a central processing unit 2 to convert the data into an actual address of a memory location corresponding to the data. As a result, the processing by the central processing unit becomes more complicated. Another example of the conventional video display control systems will be described below. This conventional system is capable of displaying a variety of patterns as a still image on the screen. However, the still image displayed in this system is nothing but a combination of selected ones of a predetermined number (for example, 256) of patterns previously stored in the video data memory, each of the patterns being composed of, for example, 8×8 display elements or dots. And therefore, this conventional system can not display a very complicated still image and can not also display even a simple still image in some cases. For example, it is often desired for this kind of display control system to display a still image with a moving line on the screen, however, with this conventional system, it has been impossible to display such a still image. The reason for this is that, to display a still image with a moving line on the screen, the patterns in the video data memory and the combination thereof must be changed by the central processing unit at a high rate. Also, it is often required for this kind of system to display on the screen a still image with a complicated line such as a circle, however, with the conventional system, such a still image can not have been displayed, since the conventional system has not been capable of displaying a dot at a desired position on the screen. Furthermore, this conventional system can not paint out a selected display area in a still image on the screen in a rapid manner. The reason for this is that the conventional system has not been capable of detecting a boundary between an area on the screen and areas surrounding it, such a detection being essential to a paint-out of an area on the screen. And therefore, the central processing unit has required much time to execute a program for such a detection. Further examples of the conventional video display systems are shown in U.S. Pat. Nos. 4,243,984, 4,262,302, 4,374,395 and 4,387,406, however none of them have overcome the above-described deficiencies of the conventional video display control systems.

SUMMARY OF THE INVENTION

It is therefore an object of the present invention to provide a video display control system constructed by a video data memory and a video display processor which can convert simple area information representing a desired display area on the screen into memory addresses of memory locations of the video data memory corresponding to the display area without the aid of a central processing unit and can access the memory locations in accordance with the memory addresses so that a block of video data are written into or read from the memory locations of the video data memory which correspond to the desired display area.

It is another object of the present invention to provide such a system in which memory locations of a video data memory can be filled with a video image data in accordance with simple area information representing a desired display area on the screen so that the display area is painted out with a color corresponding to the video data.

It is a further object of the present invention to provide such a system in which a video data can be stored into a memory location of a video data memory in accordance with simple area information representative of a dot on a screen so that the dot is displayed in a color corresponding to the video data.

It is a further object of the present invention to provide such a system in which a line can be displayed on a screen in accordance with a video data representative of a color of the line and in accordance with simple area information representative of the line on the screen.

It is a further object of the present invention to provide such a system in which a boundary between two areas on the screen can be detected in accordance with a video data representative of one of colors of the two areas and in accordance with an area information representative of a row passing through the two areas.

Other objects and advantages of the present invention will be apparent in the detailed specification, when read in conjunction with the accompanying drawings which illustrate the preferred embodiment of the invention.

According to the present invention, there is provided a video display control system for displaying a video image on a screen of a video display unit comprising memory means having a plurality of memory locations each corresponding to a respective one of display elements on the screen; and display control means having a first register for storing area information representative of a display area on the screen which includes at least one of the display elements, address generating means responsive to the area information stored in the first register for generating first address data indicative of a memory location among the plurality of memory locations, the memory location corresponding to one of display elements in the display area, and memory access means for accessing the memory location in accordance with the first address data. The display control means may further comprise a second register for storing the image data to be written into or read from the memory location accessed by the accessing means in accordance with the first address data. The address generator means may further generate, in accordance with the area information, second address data indicative of the remainder of the plurality of memory locations, the access means further accessing the remainder of the plurality of memory locations in accordance with the second address data to write thereinto or read therefrom the image data. The video display control system may further comprise a central processing unit for outputting a plurality of image data to be written into the memory means to the second register and for receiving a plurality of image data read from the memory means through the second register. In this case, the area information may comprise a first data representative of one of the display elements and a second data representative of another of the display elements, the display elements forming a straight line lying between the one of the display elements and the another of the display elements. The display control means may further comprise comparing means for comparing image data read from a memory location with image data stored in the second register to output a comparison result, the accessing means further reading an image data from one of the plurality of memory locations exclusive of the accessed memory location in accordance with the comparison result.

BRIEF DESCRIPTION OF THE DRAWINGS

FIG. 2-(*b*) is a memory map of the VRAM 2 of FIG. 1 in the G IV mode whose area is divided into a still image data area 2*a*, an additional memory area 2*b* and an animation image data area 2*c*;

FIG. 2-(*c*) is an illustration showing each of color codes stored in the still image data area 2*a* in the G IV mode;

FIGS. 3-(*b*), 4-(*b*) and 5-(*b*) are illustrations similar to FIG. 2-(*b*) but showing such relations in G V, G VI and G VII modes, respectively;

FIGS. 3-(*c*), 4-(*c*) and 5-(*c*) are illustrations similar to FIG. 2-(*c*) but showing such relations in G V, G VI and G VII modes, respectively;

FIG. 8-(*a*) is an illustration showing bit data DIRX and DIRY stored in the argument register 32 of the command processing circuit 15 of FIG. 6;

FIG. 8-(*b*) is an illustration showing flags TR, BD and CE in the flag register 33 of the command processing circuit 15 of FIG. 6;

FIGS. 9-(*b*), 9-(*c*) and 9-(*d*) are illustrations similar to FIG. 9-(*a*) but showing such relations in the G V, G VI and G VII modes, respectively;

FIG. 10 is an illustration showing areas displayed respectively by a high-speed move command and a logical operation and move command on the screen;

FIG. 12 is an illustration showing display areas defined by the contents of the DX, DY, NX, NY, DIRX and DIRY registers;

FIGS. 13-(*b*), 13-(*c*) and 13-(*d*) are illustrations similar to FIG. 13-(*a*) but showing such orders when the bit data DIRX is "0" with the bit data DIRY of "1", when both of the bit data DIRX are "1", and when the bit data DIRX is "1" with the bit data DIRY of "0", respectively;

FIG. 18-(*a*) is an illustration showing a color code in a byte of data outputted from the CPU 4 in the G IV or G VI mode;

FIGS. 18-(*b*) and 18-(*c*) are illustrations similar to FIG. 18-(*a*) but showing such color codes in the G V and G VII modes, respectively;

FIG. 19 is an illustration showing the relation between a color code in a byte outputted from the CPU 4 and color codes stored in a memory address of the still image data area 2*a* of the VRAM 2 in the G V mode;

FIG. 20 is an illustration showing a color code in the LOR register 50 before and after a shift operation;

FIG. 21 is a flow chart of a part of the processing of a logical operation and move command for transferring a block of color codes from the VRAM 2 to the CPU 2 (LMCM command);

FIG. 22 is an illustration showing the relation between a color code in a byte transferred to the CPU 4 and color codes read from a memory address of the still image data area 2*a* of the VRAM 2 in the G V mode;

FIG. 23 is a block diagram of a part of the processing of a logical operation and move command for transferring to the VRAM 2 logically operated one of a color code supplied to the command processing circuit 15 (LMMV command);

FIG. 26-(*a*) is an illustration showing a bit data XM and the bit data DIRX and DIRY stored in the argument register 32;

FIG. 26-(*b*) is an illustration again showing the TR, BD and CE flags in the flag register 33;

FIG. 27 is an illustration showing straight lines L1 to L4 defined by x and y coordinates of a start point P1, Maj, Min and signs of the Maj and Min;

FIG. 28 is an enlarged illustration of the straight line L1 of FIG. 27;

FIG. 30 is an illustration showing two display areas Q1 and Q2 on the screen;

FIG. 31-(*a*) is an illustration showing a bit data NE and the bit data DIRX and DIRY stored in the argument register 32;

FIG. 31-(*b*) is an illustration again showing the TR, BD and CE flags in the flag register 33;

FIG. 33 is an illustration showing the two display areas Q1 and Q2 and a display area Q3 disposed within the area Q1 on the screen.

DESCRIPTION OF THE PREFERRED EMBODIMENT OF THE INVENTION

Figure 1:
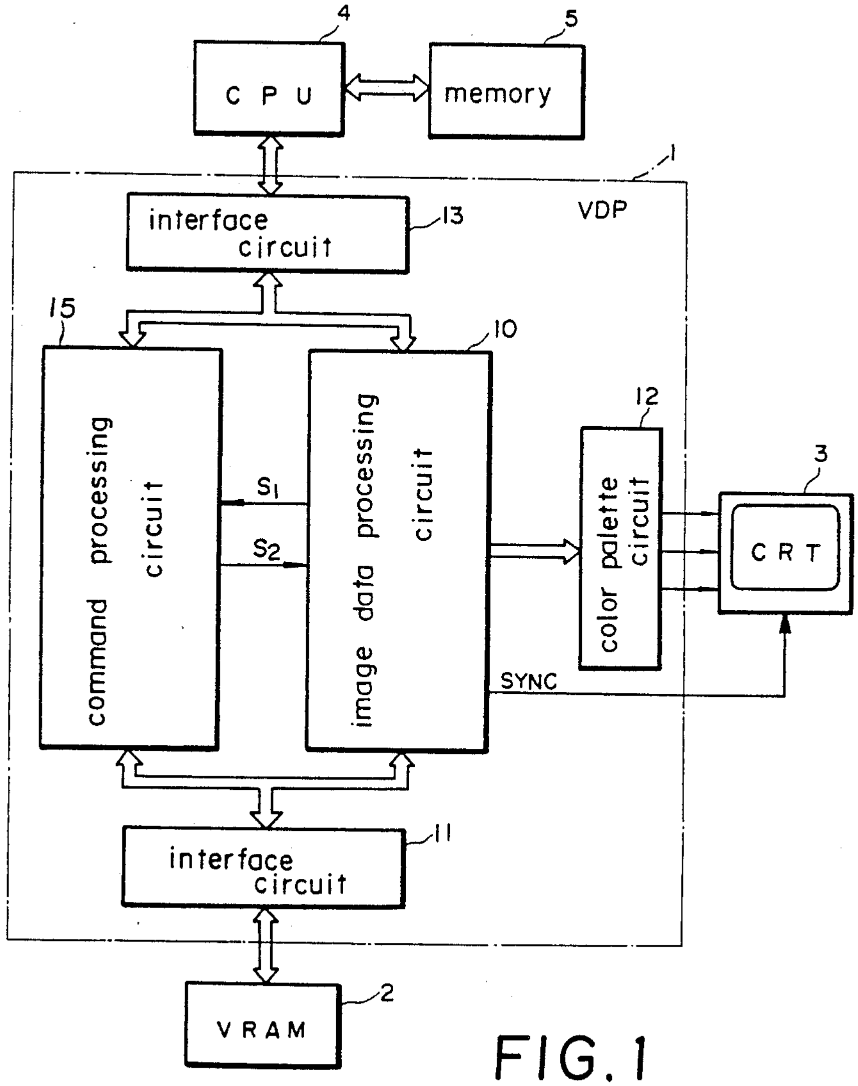
FIG. 1 is a block diagram of a video display control system provided in accordance with the present invention.

Shown in FIG. 1 is a video display control system provided in accordance with the present invention. This video display control system comprises a video display processor (hereinafter referred to as VDP) 1 which serves to display still and animation images on a display unit 3 in accordance with image data stored in a VRAM (video RAM) 2. The VDP 1 is so constructed that the contents of the VRAM 2 can be changed and that a part or all of the contents of the VRAM 2 can be transferred to an external device in accordance with command and image data supplied thereto from a central processing unit (hereinafter referred to as CPU) 4. A variety of image data and programs to be used by the CPU 4 are stored in a memory 5.

The VDP 1 comprises an image data processing circuit 10 which serves to read via an interface circuit 11 still and animation image data from VRAM 2 at a speed corresponding to the scanning speed of a screen of the video display unit 3 and supplies the data read from the VRAM 2 to a color palette circuit 12. The color palette circuit 12 in turn converts the data into analog R, G and B signals and feeds them to the video display unit 3. Further, the image data processing circuit 2 supplies the video display unit 3 with a synchronization signal SYNC necessary for the scanning of the screen. The still and animation image data are composed of color codes each representing a color of a respective one of display elements (or display dots) on the screen, each of the color codes comprising two, four or eight bits as will be described later. As a result, the image corresponding to the image data can be displayed on the screen of the video display unit 3. The image data processing circuit 10 is also so constructed as to store image data, supplied from the CPU 4 via an interface circuit 13, into the VRAM 2 through the interface circuit 11. During an access to the VRAM 2, i.e., when writing data into the VRAM 2 or when reading data from the VRAM 2, the image data processing circuit 10 supplies a signal S1 to a command processing circuit 15 to inform that the processing circuit 10 is accessing the VRAM 2.

The command processing circuit 15 performs one of command processing operations, which are previously programmed therein, in response to a command data fed thereto from the CPU 4 via the interface circuit 13, the programmed operations including changing of still image data in the VRAM 2 and transferring of still image data from the VRAM 2 to an external device. The command processing circuit 15 is prevented from an access to the VRAM 2 when the signal S1 is supplied thereto from the image data processing circuit 10.

A display operation of a still image on the screen will now be described. To display a still image on the screen, the video display control system shown in FIG. 1 operates in one of a plurality of display modes which can be classified broadly into two groups of modes, i.e., pattern display modes for displaying selected patterns each composed of, for example, 8×8 display elements or 8×6 display elements on the screen, and dot-map modes in which each of display elements (or dots) on the screen can be displayed in a desired color independently from the other dots. The operation of this system in the pattern display modes is almost the same as those of the conventional systems, and therefore the operation of this system only in the dot-map modes will be described here.

The dot-map modes of this system includes four kinds of modes, namely, G IV, G V, G VI and G VII modes, and the relation between memory locations to store still image data in the VRAM 2 and their display positions on the screen in each of the dot-map modes will be described hereinafter.

(1) G IV mode

Figure 2:
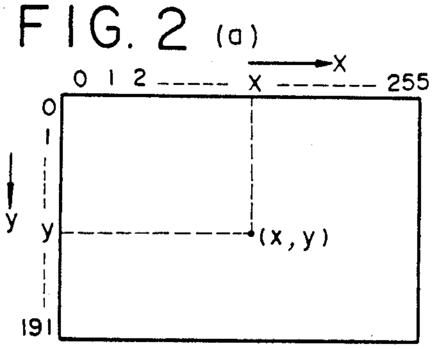
FIG. 2-(*a*) is an illustration showing the relation between a screen and x and y coordinates of display elements (or display dots) displayed on the screen in G IV mode.
Figure 2:
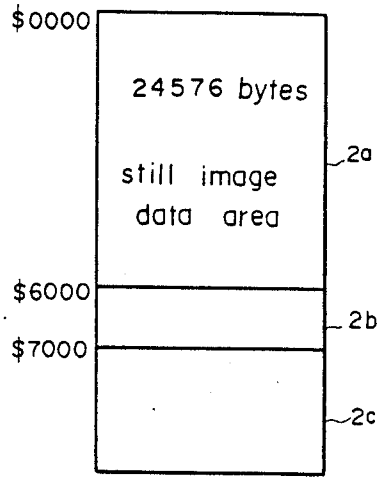
Figure 2:
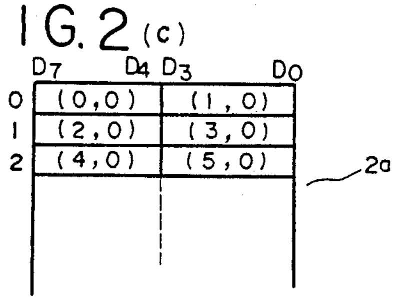

In this G IV mode, a still image is displayed on the screen with 256×192 elements (or dots) as shown in FIG. 2-(*a*), and color codes equal in number and respectively corresponding to all of the elements constituting the screen are stored in a still image data area 2*a* of the VRAM 2 as shown in FIG. 2-(*b*). Each of the color codes in this display mode is composed of four bits and is stored in the area 2*a* in an order shown in FIG. 2-(*c*), each memory location or address in the still image data area 2*a* storing two consecutive color codes. Each color code is thus composed of four bits, so that each element on the screen in this display mode can be displayed in a selected one of sixteen colors and that the still image data area 2*a* occupies consecutive 24576 bytes in the VRAM 2. An area 2-*c* of the VRAM 2 is a memory area for storing a variety of data necessary for a display of an animation image on the screen, and an area 2*b* is an additional memory area and is not normally used. The additional memory area 2*b* is located in the VRAM 2 in such a manner that the first address thereof comes next to the last address of the still image data area 2*a*, and stores additional color codes for displaying a still image.

(2) G V mode

Figure 3:
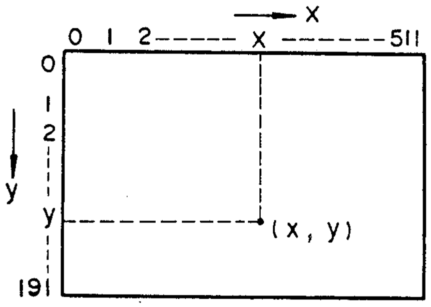
FIGS. 3-(*a*), 4-(*a*) and 5-(*a*) are illustrations similar to FIG. 2-(*a*) but showing such relations in G V, G VI and G VII modes, respectively.
Figure 3:
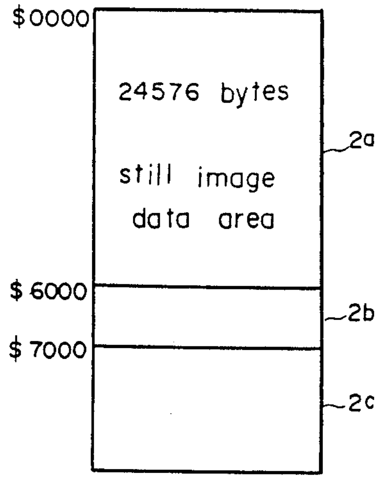
Figure 3:
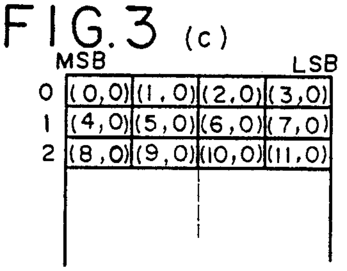

In this G V mode, a still image is displayed on the screen with 512×192 elements (or dots) as shown in FIG. 3-(*a*), and color codes equal in number and corresponding to all of the elements constituting the screen are stored in a still image data area 2a of the VRAM 2 in the same manner as in the G IV mode. Each of the color codes in this display mode is composed of two bits and is stored in an order shown in FIG. 3-(*c*), each address in the still image data area 2a storing four color codes. The still image data area 2a occupies consecutive 24576 bytes as the area 2a in the G IV mode. This is because the elements in the horizontal direction or the row direction X in this G V mode are double as many as those in the G IV mode but the number of bit of each color code in this display mode is half of that in G IV mode. Each of the color codes is thus composed of two bits, so that each element on the screen in this display mode can be displayed in a selected one of four colors. An area 2b and an area 2c of the VRAM 2 in this display mode are identical to those of the VRAM 2 in G IV mode.

(3) G VI mode

Figure 4:
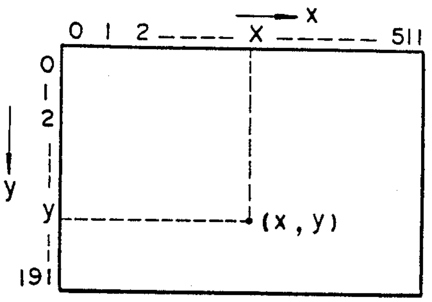
Figure 4:
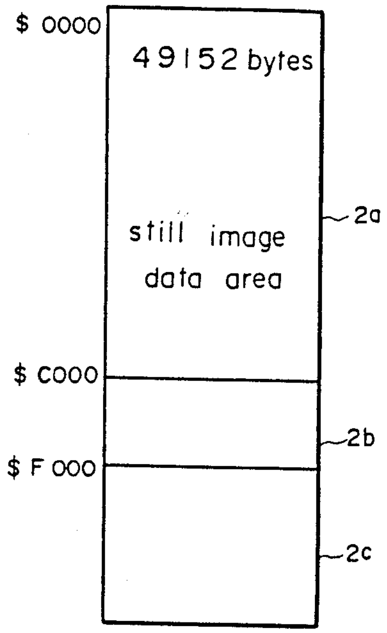
Figure 4:
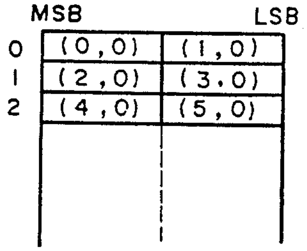

In this G VI mode, a still image is displayed on the screen with 512×192 elements (or dots) as shown in FIG. 4-(*a*), and each of color codes is composed of four bits as in the G IV mode. As a result, the still image data area 2a in this display mode occupies, as shown in FIG. 4-(*b*), consecutive 49152 bytes which are double as many as those in the G IV mode. The color codes in this display mode are stored in the still image data area 2a in an order shown in FIG. 4-(*c*).

(4) G VII mode

Figure 5:
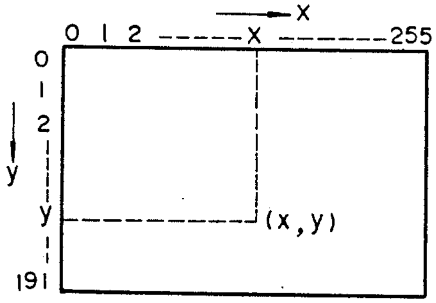
Figure 5:
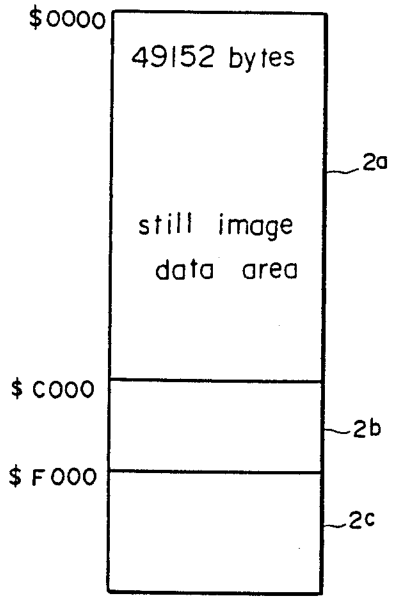
Figure 5:
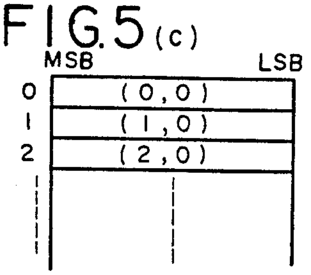

In this G VII mode, each of color codes is composed of eight bits so that each element on the screen can be displayed in a selected one of 256 colors. In this display mode, a still image is displayed on the screen with 256×192 elements (or dots) as shown in FIG. 5-(*a*), and a still image data area 2a occupies consecutive 49152 bytes as the area 2a of the VRAM 2 in the G VI mode. The color codes in this display mode are stored in the still image data area 2a in an order shown in FIG. 5-(*c*), each address of the area 2a storing one color code.

Incidentally, the command processing circuit 15 is constructed so as to perform changing and transferring of the color codes in the still image data area 2a in accordance with the command data applied thereto only in the above described G IV to G VII modes. The command processing circuit 15 will now be described more specifically.

Figure 6:
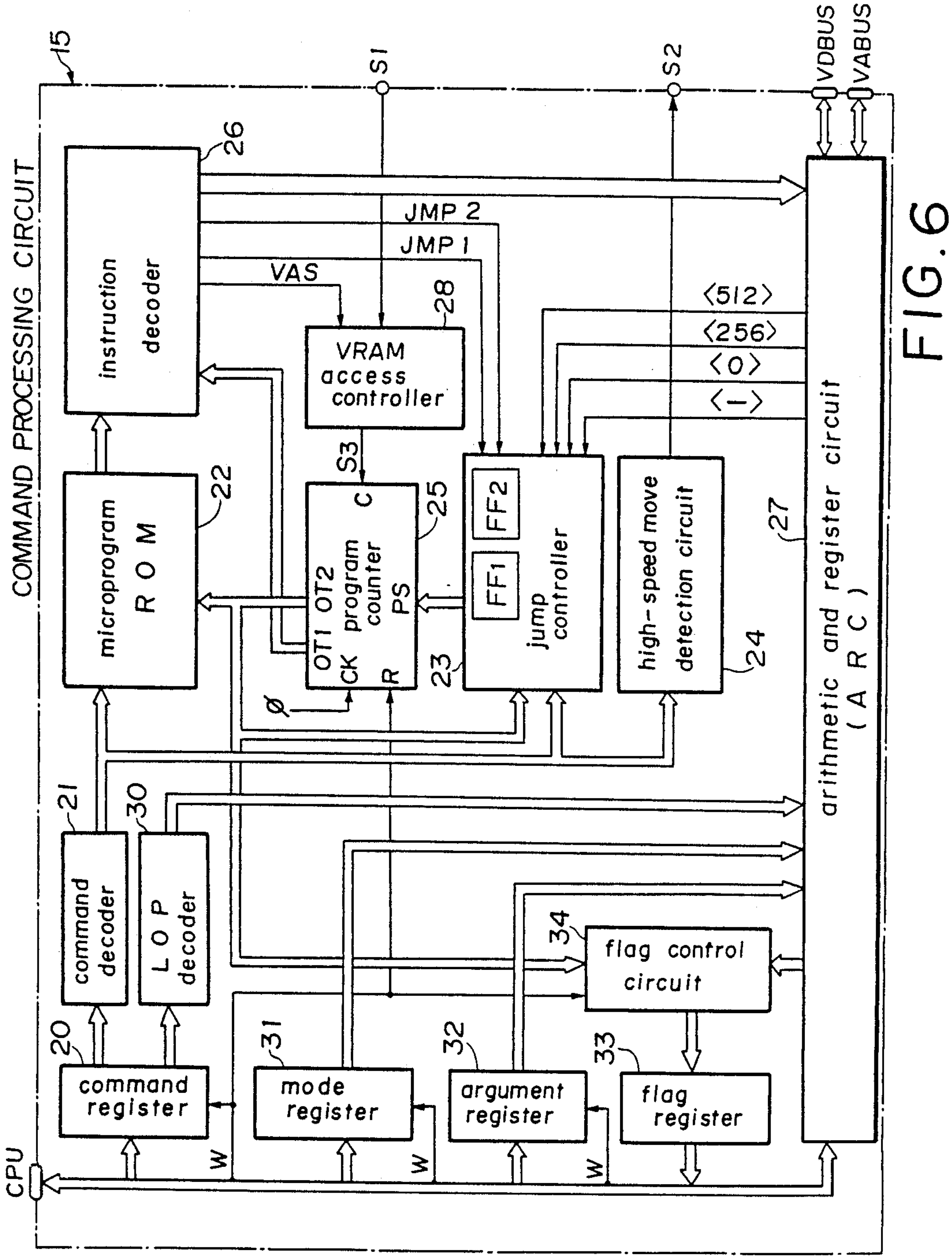
FIG. 6 is a block diagram of the command processing circuit 15 of a video display processor 1 in the video display control system of FIG. 1.

The command processing circuit 15 shown in FIG. 6 comprises a command register 20 for storing command data outputted from the CPU 4. Commands represented by the command data are classified broadly into two groups of commands, one of which includes high-speed move commands for performing a transfer of data at a high speed, and the other of which includes logical operation and move commands for performing, in addition to a transfer of data, a logical operation such as AND, OR, NOT and EXCLUSIVE OR between the data to be transferred to a selected address in the VRAM 2 and data existing in the selected address and for transferring the logical operation result to the selected address in the VRAM 2. The commands also include special commands such as a command for reading a color code of a desired display element on the screen, a command for writing into the VRAM 2 a color code of a desired display element on the screen, a command for display a line on the screen, and a command for making a search for a desired color code. The upper four bits of the command data selects one of the above-described commands, and the lower four bits of the command data selects one of the logical operations only when a logical operation and move command is selected by the upper four bits of the command data. The data contained in the upper four bits of the command register 20, i.e., a command selection portion of the command data, is decoded by a command decoder 21, and the decoded data is fed to a microprogram ROM 22, a jump controller 23 and a high-speed move detection circuit 24. The microprogram ROM 22 previously stores therein a plurality of microprograms each corresponding to a respective one of the commands. The output data of the command decoder 21 selects one of the microprograms, and steps or instructions of the selected microprogram are sequentially read from the microprogram ROM 22 in accordance with a count output OT2 of a program counter 25 and are fed to an instruction decoder 26. The instruction decoder 26 decodes the instructions read from the ROM 22 in accordance with a count output OT1 of the program counter 25, and feeds the results of the decoding to an arithmetic and register circuit (hereinafter referred to as ARC) 27. The instruction decoder 26 also generates control signals JMP1, JMP2 and VAS in accordance with the decode results. The count output OT1 is ternary, while the count output OT2 is octadecimal, and the count output OT2 is incremented by one each time the count output OT1 makes a round. Thus, the instruction decoder 26 requires three steps of decoding for each of the instructions read from the microprogram ROM 22. The program counter 25 has a clock input terminal CK, a reset input terminal R, a data preset terminal PS and a count interruption terminal C. A VRAM access controller 28 controls an access to the VRAM 2 in the following manner. Assuming that the ROM 22 outputs an instruction which requires an access to the VRAM 2, the instruction decoder 26 feeds the signal VAS to the VRAM access controller 28. In response to the signal VAS, the VRAM access controller 28 determines whether the signal S1 is active, i.e., whether the image data processing circuit 10 is performing an access to the VRAM 2. And if it is determined that the signal S1 is active, the VRAM access controller 28 supplies a signal S3 to the count interruption terminal C of the program counter 25 to interrupt the count operation thereof. As a result, the instruction decoder 26 is prevented from entering into the decode operation of the instruction fed from the ROM 22, and is thus brought into a wait state. On the other hand, if it is determined that the signal S1 is not active, the VRAM access controller 28 does not output the signal S3. Consequently, the instruction decoder 26 enters into the decode operation of the instruction, so that an access to the VRAM 2 is effected. As described above, the VRAM access controller 28 serves to prevent the command processing circuit 15 and image data processing circuit 10 from simultaneously accessing the VRAM2.

A jump controller 23 provided in the command processing circuit 15 responds to each of jump instructions in the microprogram under processing, and defines an address to which a jump operation is to be performed (hereinafter referred to as "jump-to address") in accordance with states of flip-flops FF1 and FF2 provided therein. The flip-flop FF1 is brought into a set state when one of detection signals <—>, <0>, <256> and <512> is applied to the jump controller 23 together with the signal JMP1, while the flip-flop FF2 is brought into a set state when one of the detection signals <—> and <0> is applied to the jump controller 23 together with the signal JMP2. The detection signals <—>, <0>, <256> and <512> will be more fully described later. The jump controller 23 thus produces data indicative of a jump-to address in accordance with states of the flip-flops FF1 and FF2, value of the count output data OT2 and the output signals of the command decoder 21, and then outputs the produced address data to the data preset terminal PS of the program counter 25. The program counter 25 then outputs the preset address data as the count output OT2, so that the sequence of execution of the instructions in the microprogram under processing is changed to an instruction in the jump-to address indicated by the count output OT2.

A high-speed move detection circuit 24 determines whether the command indicated by the command data in the command register 20 belongs to the high-speed move instructions, and if it is determined that the command is one of the high-speed move instructions, the high-speed move detection circuit 24 outputs a signal S2 to the image data processing circuit 10. The image data processing circuit 10 is prevented from processing the animation image data during the time when the signal S2 is being supplied thereto. The reason for this is that, in the case of the high-speed move instructions, the command processing circuit 15 has to perform an access to the VRAM 2 using time slots assigned to process of the animation image data in addition to those assigned to process of the still image data.

A logical operation decoder (hereinafter referred to as "LOP decoder") 30 decodes the data in the lower four bits of the command register 20, i.e., the data for selection of one of the logical operations, and supplies the decoded result to an LOP unit 60 (FIG. 7) in the ARC 27. The LOP unit 60 performs a logical operation selected by the decoded result supplied from the LOP decoder 30.

A mode register 31 stores a mode selection data supplied from the CPU 4 and indicating one of the G IV to G VII modes, and supplies the stored mode selection data to the ARC 27. An argument register 32 is comprised of an eight-bit register, as shown in FIG. 8-(*a*), and stores an argument data supplied from the CPU 4. The argument data includes a pair of bit data DIRX and DIRY for determining the directions in which an address of the VRAM during transferring of the color codes is advanced with respect to the column and row directions on the screen. A flag register 33 stores flags which serves to inform the CPU 4 of the status of this command processing circuit 15, the flags including a flag TR for indicating that the command processing circuit 15 is ready to transfer a data to the CPU 4 or to receive a data from the CPU 4, a flag BD for indicating a detection of a boundary between display areas, and a flag CE for indicating that the command processing circuit 15 is executing a command. A flag control circuit 34 controls the flags in the flag register 33 in accordance with the count output OT2 of the program counter 25, an output of the ARC 27 and a write strobe W of the CPU 4.

Figure 7:
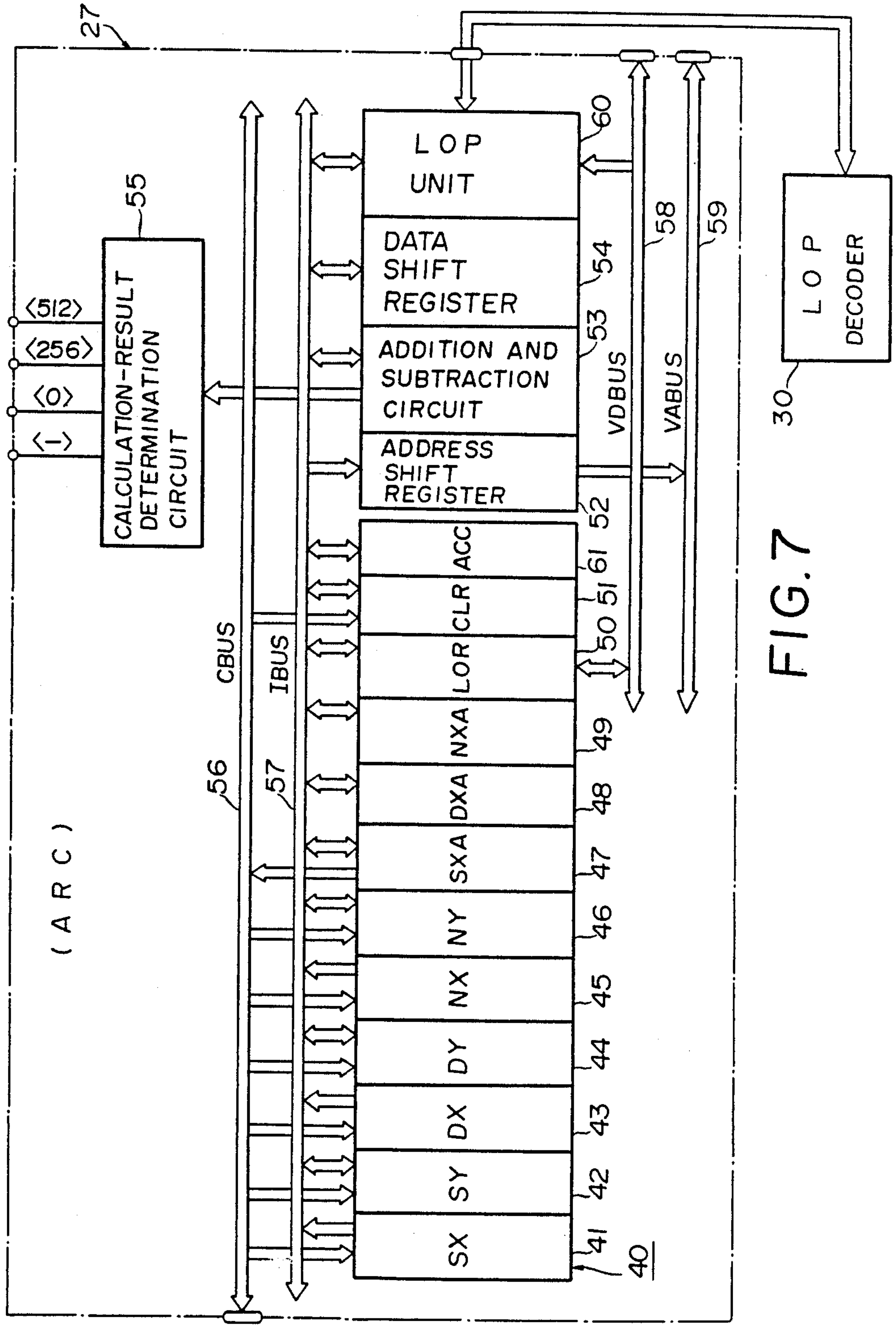
FIG. 7 is a block diagram of the arithmetic and register circuit 27 of the command processing circuit 15 of FIG. 6.

The construction of the ARC 27 will now be more fully described. As shown in FIG. 7, the ARC 27 comprises the LOP unit 60, a register section 40, an address shift register 52 for shifting an address data, an addition and subtraction circuit 53 for performing addition and subtraction of data, a data shift register 54 for shifting a color code data, and an calculation-result determination circuit 55 for determining whether the results of an operation performed by the addition and subtraction circuit 53 is a negative value, "0", "256" or "512". The calculation-result determination circuit 55 outputs signals indicative of the determination results to the jump controller 23. The ARC 27 comprises SX and SY registers 41 and 42 for respectively storing column and row addresses (x and y-coordinates) of a display element whose color code is to be read from the VRAM 2. Similarly, DX and DY registers 43 and 44 in the ARC 27 store column and row addresses (x and y coordinates) of a display element whose color code is to be written into the VRAM 2. An NX register 45 in the the ARC 27 stores the number of those of a row of display elements disposed within a selected display area on the screen. Similarly, an NY register 46 in the the ARC 27 stores the number of those of a column of display elements disposed within the selected display area. SXA register 47, DXA register 48 and NXA register 49 are auxiliary registers of the SX register 41, DX register 43 and NX register 45, respectively. A LOR register 50 in the ARC 27 temporarily stores a color code data to be subjected to a logical operation, and a CLR register 51 temporarily stores a color code data to be transferred to or received from the CPU 4. There is also provided an ACC register 61 which serves as an accumulator. The ARC 27 performs transfer of data with the CPU through a common bus (hereinafter referred to as CBUS) 56 and performs internal data transfer through an internal bus (hereinafter referred to as IBUS) 57. The ARC 27 also has a data bus (hereinafter referred to as VDBUS)58 for transfer of data with the VRAM 2 and has an address bus (hereinafter referred to as VABUS) 59 for addressing the VRAM 2.

Figure 9:
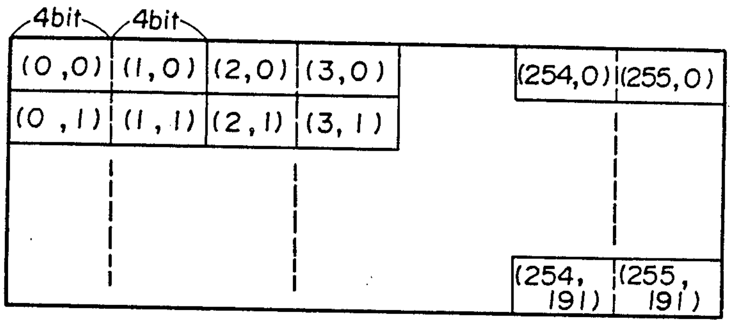
FIG. 9-(*a*) is an illustration showing the relation between display dots on the screen and color codes stored in the VRAM 2 in G IV mode.
Figure 9:
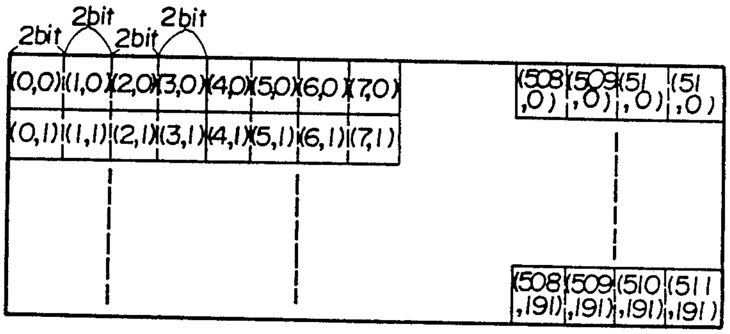
Figure 9:
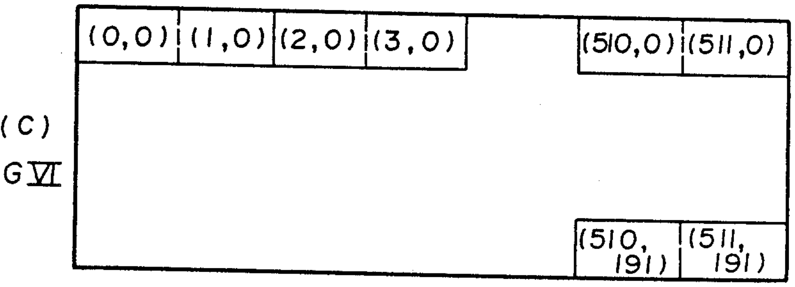
Figure 9:
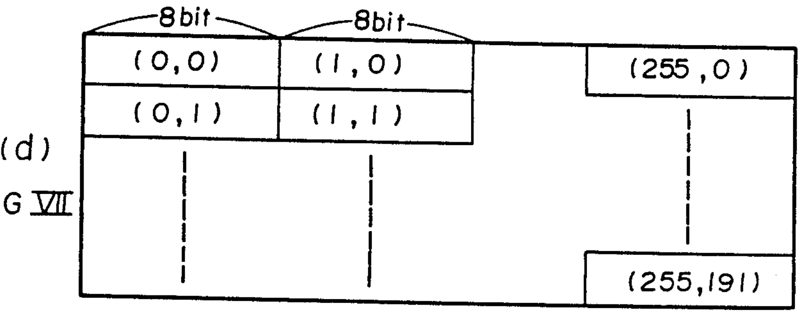

FIG. 9-(*a*) shows the relationship between each of display positions or coordinates of display elements (or dots) on the screen and a color code of a respective one of the elements in the G IV mode. Similarly, FIGS. 9-(*b*) 9-(*c*) and 9-(*d*) show such relationships in the G V, G VI and G VII modes, respectively. In each of FIGS. 9-(*a*) to 9-(*d*), each block of display elements surrounded by solid lines corresponds to each byte in the VRAM 2. As is apparent from FIGS. 9-(*a*) to 9-(*d*), colors of two consecutive elements on the screen can be determined by one byte of color codes in the G IV and G VI mode, colors of four consecutive elements in the G V mode, and a color of one element in the G VII mode. In the case of the high-speed move commands, color codes are transferred on a byte basis. More specifically, two color codes for displaying two consecutive elements are transferred at a time in the G IV and G VI modes, four color codes for displaying four consecutive elements in the G V mode, and one color code for displaying one element in the G VII mode. And therefore, in the case of a block transfer of color codes, color codes of elements in a display area such as one hatched by solid lines in FIG. 10 can be transferred, but color codes of elements in a display area such as one hatched by broken lines in FIG. 10 can not be transferred, the left end and right end lines of the area hatched by broken lines lying between opposite ends of each of the corresponding bytes. On the other hand, in the case of the logical operation and move commands and the special commands, a transfer of a color code or color codes is performed on an element basis, i.e., on a two, four or eight bit basis depending on the current display mode.

And therefore, in the case of a block transfer of color codes, color codes of elements in a display area such as one hatched by solid lines and also one hatched by broken lines in FIG. 10 can be transferred. Incidentally, in FIG. 10, each rectangle represents an area which is displayed by a respective one of bytes in the still image data area 2*a* of the VRAM 2.

The operation of this video display control system will now be described with respect to each of the aforementioned commands.

High-speed Move from CPU to VRAM

First, the operation of the video display control system when a high-speed move command for transferring a block of color codes from the CPU 4 to the VRAM 2 (hereinafter referred to as HMMC command) is executed will be described with reference to a flow chart shown in FIG. 11. At block CP1, the CPU 4 defines a display area on the screen of the video display unit 3 to be displayed based on the block of color codes by storing parameters into the DX register 43, DY register 44, NX register 45, NY register 46 and the argument register 32. Assuming that the display area is one of rectangular display areas A1, A2, A3 and A4 shown in FIG. 12, the CPU 4 stores the x, y coordinates ,i.e., the column and row positions, of a reference element (or dot) P or a corner element (or dot) P of the display area into the DX register 43 and DY register 44, respectively, and then stores the number of columns within the display area and the number of rows within the area into the NX register 45 and NY register 46, respectively. The CPU 4 also stores a pair of bit data DIRX and DIRY into the third and fourth bits D2 and D3 of the argument register 32, respectively (FIG. 8-(*a*)). The value stored in the NX register 45 represents the number of columns counted rightwardly from the reference element P when the bit data DIRX is "0", while the value in the NX register 45 represents the number of columns counted leftwardly from the reference element P when the bit data DIRX is "1". Similarly, the value stored in the NY register 46 represents the number of rows counted downwardly from the reference element P when the bit data DIRY is "0", while the value in the NY register 46 represents the number of rows counted upwardly from the reference dot P when the bit data DIRY is "1". Thus, any one of the display areas A1 to A4 can be selected by storing an appropriate combination of bit data DIRX and DIRY into the bits D2 and D3 of the argument register 32 with the x and y-coordinates of the reference element (or point) P being stored in the DX and DY registers 43 and 44.

At block SP1, the CPU 4 stores a command data representative of the HMMC command into the command register 20, whereupon the flag control circuit 34 sets the flag CE to inform the CPU 4 that the command has been stored in the command register 20 (block SP2). During the time when the flag CE is in a set state, the CPU 4 is prevented from storing the next command data into the command register 20. Then, the command processing circuit 15 transfers the contents of the DX and NX registers 43 and 45 to the DXA and NXA registers 48 and 49, respectively (block SP3).

CPU 4 also transfers color code data to be stored into one of memory locations corresponding to the display area of the VRAM 2 to the CLR register 51 at block CP2 and then resets the TR flag in the flag register 33 (FIG. 8) at block CP3.

Upon completion of the processing at block SP3, the command processing circuit 15 determines whether the TR flag is in a reset state at block SP4, and if the determination is "NO", the control of the command processing circuit 15 returns to the beginning of the block SP4 to form a loop $l_1$. On the other hand, if the determination at block SP4 is "YES", i.e., if the CPU has reset the TR flag at block SP3, the processing proceeds to block SP5 at which the command processing circuit 15 transfers the color code data stored in the CLR register 51 to the LOR register 50. Thus, the processing at the block SP4 with the loop $l_1$ determines whether the CPU 4 has transferred color code data to the CLR register 51. Thereafter, the command processing circuit 15 sets the TR flag at block SP6, and the processing proceeds to block SP7.

The command processing circuit 15 thus sets the TR flag at block SP6 whereupon the CPU 4 transfers the next color code data to the CLR register 51 and then resets the TR flag (blocks CP2 and CP3). Thus, the CPU 4 is so designed as to detect the state of the TR flag and to transfer color code data to be stored into the VRAM 2 to the CLR register 51 if the TR flag is in a set state. However, the processing by the command processing circuit 15 proceeds to block SP7 immediately after the completion of the processing at the block SP6, and therefore, the next color code stored in the CLR register 51 will not be transferred to the LOR register 50 until the processing at the block SP5 is again performed by the command processing circuit 15.

At the block SP7, the command processing circuit 15 performs the following processing. Assuming that the G IV mode is presently selected and that the CPU 4 stores into the VRAM 2 a color code of an element (or a dot) at coordinates (x, y) on the screen, the command processing circuit 15 first calculates the address of a memory location in the still image data area 2*a* which corresponds to the coordinates (x, y). In the G IV mode, color codes each composed of four bits are stored in the still image data area 2*a*, which begins from an address "0", in such an order shown in FIG. 2-(*c*). And therefore, the memory address corresponding to the coordinates (x, y) can be calculated by the following equation:

$$y*128+x/2 \quad (1)$$

The above equation (1) can be established by shifting the data in the DY register 44, which represents the row position of the element, by seven bits in the direction of the higher-order bits thereof; by shifting the data in the DXA register 48, which represents the column position of the element, by one bit in the direction of the lower-order bits thereof wherein the $2^{-1}$ bit is neglected; and by combining the two data obtained respectively by the above two shift operations.

Similarly, the addresses of the VRAM 2 in the G V mode, G VI mode and G VII mode can be obtained respectively by equations (2), (3) and (4) given below.

$$y*128+x/4 \quad (2)$$

$$y*256+x/2 \quad (3)$$

$$y*256+x \quad (4)$$

As is appreciated from the equation (2), in the case of the G V mode, the address in the VRAM 2 is formed by shifting the data in the DY register 44 by seven bits in the direction of the higher-order bits thereof; by shifting the data in the DXA register 48 by two bits in the direction of lower-order bits thereof wherein the $2^{-1}$ and $2^{-2}$ bits are neglected; and by combining the two data obtained respectively by the above two shift operations. Similarly, in the case of the G VI mode, the address in the VRAM 2 is formed by shifting the data in the DY register 44 by eight bits in the direction of the higher-order bits thereof; by shifting the data in the DXA register 48 by one bit in the direction of lower-order bits thereof wherein the $2^{-1}$ bit is neglected; and by combining the two data obtained respectively by the above two shift operations. And in the case of G VII mode, the address in the VRAM 2 is formed by shifting the data in the DY register 44 by eight bits in the direction of the higher-order bits thereof and by combining the data obtained by the above shift operation with the data in the DXA register 43.

In the command processing circuit 15, the formation of the address is achieved by the address shift register 52 shown in FIG. 7 in the following manner. The address shift register 52 first determines, in accordance with the mode selection data in the mode register 31, the number of bits by which a shift operation with respect to the data in the DXA register 48 should be performed. The address shift register 52 then shifts the data in the DXA register 48 downwadly by the determined number of bits and outputs the shifted data onto the lower half AL (eight bits) of the VABUS 59. In the case of the G VI and G VII modes, the address shift register 52 also outputs the data in the DY register 44 onto the higher half AH (eight bits) of the VABUS 59 to perform an upward eight-bit shift operation of the data in DY register 44. On the other hand, in the case of the G IV and G V modes, the address shift register 52 shifts the data in the DY register 44 downwardly by one bit and outputs the LSB of the shifted data and the rest of the shifted data respectively onto the MSB of the lower half AL of the VABUS 59 and the higher half AH of the VABUS 59, whereby an upward seven-bit shift operation of the data in the DY register 44 is performed.

At block SP7, if it is determined that the command under processing requires an access to the VRAM 2, the instruction decoder 26 shown in FIG. 6 outputs the signal VAS to the VRAM access controller 28. In response to the signal VAS, the VRAM access controller 28 determines whether the signal S1 is active. In the case where the signal S1 is not active or when the signal S1 is rendered inactive, the ARC 27 outputs the color code data stored in the LOR register 50 onto the VDBUS 58 whereby the color code data (one byte) is stored into the address in the area *2a* of the VRAM 2 which corresponds to the element (or the dot) at the coordinates (x, y) on the screen. Thus, at this stage, color codes for displaying two consecutive elements are simultaneously stored into the VRAM 2 in the G IV and G VI modes, while color codes for displaying four consecutive elements are simultaneously stored into the VRAM 2 in the G VI mode. And in the G VII mode, a color code for displaying one element is stored into the VRAM 2.

At block SP8, a value k1 is subtracted from the data stored in the NXA register 49, the value k1 being the number of color codes which can be transferred at once. And therefore, the value k1 is "2" in the G IV and G VI modes, "4" in the G V mode, and "1" in the G VII mode. The above subtraction of the value k1 is performed by the addition and subtraction circuit 53 shown in FIG. 7. More specifically, the addition and subtraction circuit 53 first determines the value k1 in accordance with the mode selection data stored in the mode register 31, and then subtracts this value k1 from the data stored in the NXA register 49. The result of the subtraction indicates the number of elements on the current row of the display area which have not yet been transferred.

At block SP9, the instruction decoder 26 outputs the signal JMP1, and in response to this signal JMP1, the jump controller 23 determines whether the detection signal <0> is being outputted from the calculation-result determination circuit 55. If the above determination is "YES", the jump controller 23 sets the flip-flop FF1 at block SP10. The determination of "YES" at the block SP9 indicates that all of the color codes of the current row of the display area have been transferred.

At block SP12, a value k2 is added to or subtracted from the data stored in the DXA register 48. The value k2 is determined in accordance with the current display mode, and is "2" in the G IV and G VI modes, "4" in the G V mode, and "1" in the G VII mode. The determination of whether the addition or the subtraction should be selected is made in accordance with the DIRX bit in the argument register 32 shown in FIG. 8-(*a*). (*a*). In this embodiment, the addition is selected when the DIRX bit is "0", while the subtraction is selected when the DIRX bit is "1". The results of the operation executed at this block SP12 represent the x coordinate of the element of which color code should be transferred next. The addition and subtraction circuit 53 shown in FIG. 7 determines the value k2 in accordance with the mode selection data in the mode register 31, and executes one of the addition and the subtraction in accordance with the DIRX bit in the argument register 32.

At block SP13, the instruction decoder 26 again outputs the signal JMP1, and in response to this signal JMP1, the jump controller 23 performs one of the following three determinations in accordance with the detection signals outputted from the calculation-result detection circuit 55.

(i) In the case where the display mode is G IV or GVII with the DIRX bit of "0" wherein color code data of each of rows of elements (or dots) within the display area are sequentially transferred from the left to the right, the jump controller 23 determines whether the signal <256> is outputted from the calculation-result determination circuit 55. At this time, the addition and subtraction circuit 53 is outputting the results of the calculation executed at the block SP12, i.e., the contents of the DXA register 48. And therefore, the processing at the block SP13 determines whether the value of the contents of the DXA register 48 is "256". The value equal to "256" indicates that the x-coordinate of the element whose color code is transferred next is disposed outside of and rightwardly of the active display area of the screen, in which case the color code data is not transferred as will be described later.

(ii) In the case where the display mode is G V or GVI with the DIRX bit of "0", a processing similar to the above is carried out. But in this case, the jump controller 23 determines whether the signal <512> is outputted from the calculation-result determination circuit 55.

(iii) In the case where the DIRX bit is "1", in which case color code data of each of rows of elements (or dots) within the display area are sequentially transferred from the right to the left, the jump controller 23 determines regardless of the current display mode whether the signal <—> is being outputted from the calculation-result determination circuit 55. The signal <—> indicates that the x coordinate of the element whose color code data is transferred next is disposed outside of and leftwardly of the active display area of the screen, in which case the transfer of the color code data is not performed. If the determination at this block SP13 is "YES", the jump controller 23 sets the internal flip-flop FF1 (block SP14).

At block SP15, a determination of whether the flip-flop FF1 is in a set state is made. And the processing proceeds to block SP16 if the determination result is "YES", while the processing returns to the block SP4 if the determination result is "NO". The processing at this block SP15 is performed by the jump controller 23 as follows. The jump controller 23 first determines whether the flip-flop FF1 is in a set state. And if it is determined that the flip-flop FF1 is in a set state, the jump controller 23 does not output a jump-to address data. As a result, the count output OT2 is incremented to read the next instruction, i.e., an instruction for the processing of block SP16, from the microprogram ROM 22. On the other hand, if it is determined that the flip-flop FF1 is not in a set state, the jump controller 23 produces a jump-to address data (in this case an address data indicative of the address corresponding to the block SP4), and supplies this jump-to address data to the data preset terminal PS of the program counter 25. As a result, the processing proceeds to the block SP4. And during the period when the results of the determinations at the block SP15 remain in "NO", a loop of processing of the blocks SP4 through SP15 is established. In the loop of the processing, the contents of the DXA register 48 are sequentially incremented (or decremented), so that color code data of each of rows of elements within the display area are sequentially transferred to the memory locations of the VRAM 2 corresponding to the elements so that the elements are painted out in the color represented by the color code data from the left to the right (or from the right to the left) in a scanning manner.

In the case where the determination result at the block SP15 is "YES", the processing proceeds to the block SP16 at which the contents of the DX and NX registers 43 and 45 are transferred to the DXA and NXA registers, respectively. The processing at this block SP16 is identical to that at the block SP3, so that the contents of the DXA and NXA registers resume their initial values. At block SP17, the addition and subtraction circuit 53 subtracts a value "1" from the contents of the NY register 46.

At block SP18, the instruction decoder 26 outputs the signal JMP2, and in response to this signal JMP2 the jump controller 23 determines whether the calculation-result determination circuit 55 is outputting the signal <0>, that is to say, whether the result of the calculation at the block SP17 is "0". And if the signal <0> is being outputted, the jump controller 23 sets the flip-flop FF2 at block SP19. The calculation result of "0" at the block SP17 indicates that transfer of all the color codes has been completed.

At block SP20, the data in the DY register 44 is incremented or decremented by one. More specifically, the data in the DY register 44 is incremented by one if the DIRY bit is "0", while the data is decremented by one if the DIRY bit is "1". The contents of the DY register 44 represents the y coordinate of the element whose color code is being transferred, so that a y coordinate of a element whose color code is transferred next is determined at this block SP20.

Figure 13:
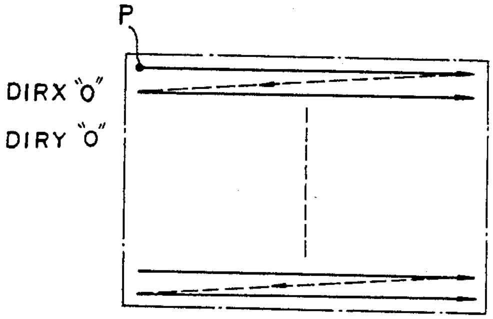
FIG. 13-(*a*) is an illustration showing the order of displaying of dots in a display area on the screen when both of the bit data DIRX and DIRY are "0"
Figure 13:
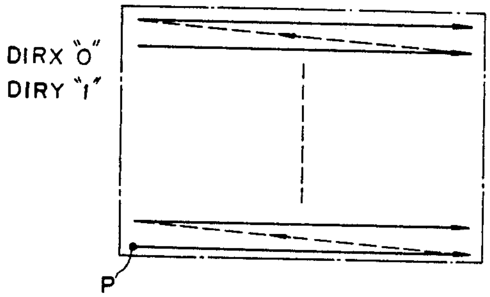
Figure 13:
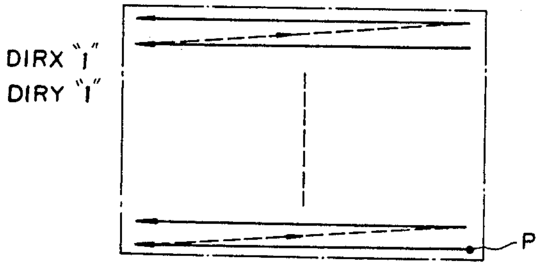
Figure 13:
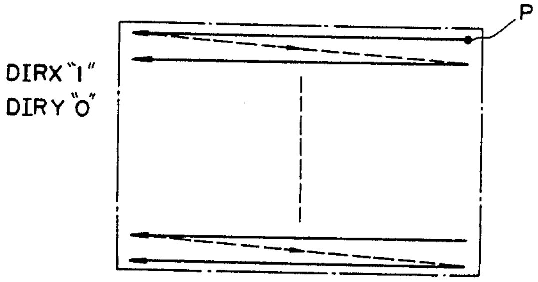

Incidentally, FIG. 13-(*a*) shows the order of transfer of color codes of elements within a display area in the case where both of the DIRX and DIRY bits are "0". Similarly, FIG. 13-(*b*) shows the order of the transfer in the case where the DIRX is "0" with the DIRY bit of "1", FIG. 13-(*c*) the order of the transfer in the case where both of the DIRX and DIRY bits are "1", and FIG. 13-(*d*) the order of the transfer in the case where the DIRX bit is "1" with the DIRY bit of "0". The areas shown in FIGS. 13-(*a*) to 13-(*d*), each surrounded by element and dash lines, indicate display areas whose color codes are transferred, and corresponds respectively to the display areas A1 to A4 shown in FIG. 12.

Upon completion of the calculation of the y coordinate, the processing in the command processing circuit 15 proceeds to block SP21. At this block SP21, the instruction decoder 26 again outputs the signal JMP2, and in response to this signal JMP2 the jump controller 23 determines whether the calculation-result determination circuit 55 is outputting the signal <—>, that is to say, whether the result of the calculation at the block SP20 is negative. And if the signal <—> is being outputted, the jump controller 23 sets the flip-flop FF2 at block SP22. The calculation result of a negative value at the block SP20 indicates that the y coordinate of the element whose color code will be transferred next is disposed outside of and upwardly of the active display area of the screen, in which case the processing is terminated, without performing a transfer of the color code, by a jump operation effected at the next block SP23. Incidentally, the result of the calculation at the block SP20 can be negative only when the DIRY bit is "1" (FIGS. 13-(*b*) and 13-(*c*)).

At the block SP23, it is determined whether the flip-flop FF2 is in a set state. In this case, the processing proceeds to block SP24 if the determination result is "YES", while the processing returns to the block SP4 if the determination result is "NO" The processing at this block SP23 is effected by the jump controller 23 in the following manner. If the flip-flop FF2 is in a reset state, the jump controller 23 supplies a jump-to address data representative of the block SP4 to the data preset terminal PS of the program counter 25. And if the flip-flop FF2 is in a set state, the jump controller 23 supplies a data indicative of the end address of the microprogram to the data preset terminal PS of the program counter 25, the end address being "17" in this embodiment. When the count output OT2 of the program counter 25 becomes equal to "17", the flag control circuit 34 resets the CE flag (FIG. 8-(*b*)) at block SP24, and the processing is terminated at block SP25. The CPU 4 detects the completion of the processing of the command from the reset state of the CE flag, and thus the command register becomes ready to accept the next command.

Figure 11:
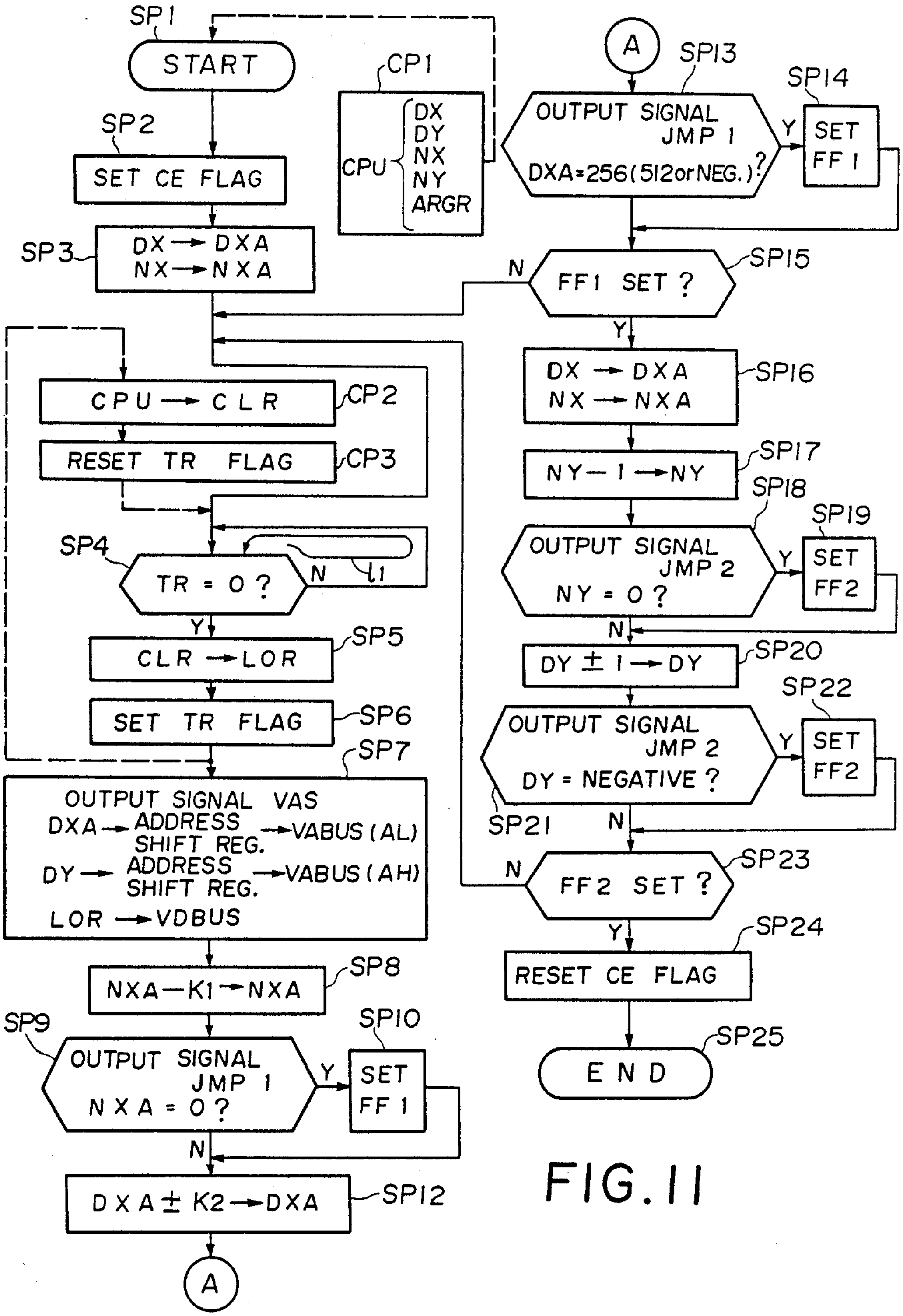
FIG. 11 is a flow chart of the processing of a high-speed move command for transferring a block of color codes from the CPU 4 to the VRAM 2 (HMMC command)

Thus, according to the processing shown in FIG. 11, the color codes supplied from the CPU 4 are sequentially stored into the predetermined area of the VRAM 2 in one of the orders shown in FIGS. 13-(*a*) to 13-(*d*).

Incidentally, in the above described processing, color codes can be transferred in the normal manner even when the y-coordinate of an element whose color code is transferred next is outside of and downwardly of the active display area of the screen, i.e., even when the contents of the DY register 44 are greater than "191".

The reason for this is that the additional data area *2b* in the VRAM 2 is located adjacent to the still image data area *2a* so that the color codes of the elements disposed outside of and downwardly of the active display area are stored into the additional data area *2b*.

As described above, the CPU 4 can store new color codes into an area of VRAM 2 corresponding to a desired display area on the screen by outputting to the command processing circuit 15 the HMMC command data together with data representative of the position of a reference element of the display area and of the direction of transfer of the color codes.

High-speed Move from VRAM to CPU

The operation of this video display control system when a high-speed move command for transferring a block of color codes from the VRAM 2 to the CPU 4 (herein after referred to as "HMCM command") is executed will now be described with reference to a flow chart shown in FIG. 14.

Figure 15:
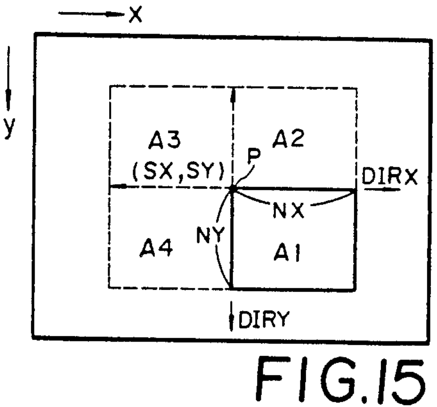
FIG. 15 is an illustration showing display areas defined by the contents of the SX, SY, NX, NY, DIRX and DIRY registers.

At block CP101, the CPU 4 defines a memory area in the VRAM 2 from which a block of color codes should be read by storing parameters into the SX register 41, SY register 42 and the argument register 32. Assuming that the memory area corresponds to one of the rectangular display areas A1, A2, A3 and A4 shown in FIG. 15, the CPU 4 stores the x and y coordinates ,i.e., the column and row positions, of the reference element (or dot) P or the corner element (or dot) P of the display area into the SX register 41 and SY register 42, respectively. The CPU 4 also stores the number of columns within the display area and the number of rows within the area into the NX register 45 and NY register 46, respectively, and stores a pair of bit data DIRX and DIRY into the argument register 32, in a manner described for the processing at the block CP1 of FIG. 11. Thus, one of the display areas A1 to A4 is selected.

At block SP101, the CPU 4 stores a command data representative of the HMCM command into the command register 20, whereupon the processing of this command begins, and the flag control circuit 34 sets the flag CE to inform the CPU 4 that the command has been stored in the command register 20 (block SP102). Then, the command processing circuit 15 transfers the contents of the SX and NX registers 41 and 45 to the SXA and NXA registers 47 and 49, respectively (block SP103).

At block SP104, the instruction decoder 26 shown in FIG. 6 outputs the signal VAS to the VRAM access controller 28. In response to the signal VAS, the VRAM access controller 28 determines whether the signal S1 is active. In the case where the signal S1 is not active or when the signal S1 is rendered inactive, the ARC 27 forms data representative of a memory address to be accessed in accordance with the contents of the SXA and SY registers 47 and 42 in a manner described for the processing at the block SP7 of FIG. 11, and outputs the address data onto the VABUS 59. The ARC 27 then stores data appearing on the the VDBUS 58 into the LOR register 50, whereby the color code data (one byte) read from the address in the area *2a* which corresponds to the element at the coordinates (x, y) on the screen is stored in the LOR register 50. Then, the processing proceeds to block SP105 which is identical to the block SP4 of FIG. 11.

At block SP106, the color code data stored in the LOR register 50 is transferred to the CLR register 51, and then, the processing proceeds to block SP107. The processings at this block SP107 and the subsequent blocks SP108, SP109 and SP110 are identical to those at the blocks SP6, SP8, SP9 and SP10 of FIG. 11, respectively. Upon completion of the processing at the block SP107, the CPU 4 detects the set state of the TR flag and reads the color code data in the CLR register 51 at block CP102. The CPU 4 then resets the TR flag at block CP103. Thus, during the time when the TR flag is in a reset state, the command processing circuit 15 is enabled to store a color code data into the CLR register 51, whereas the CPU 4 is prevented from reading a color code data from the CLR register 51. On the other hand, during the time when the TR flag is in a set state, the CPU is enabled to read a color code data from the CLR register 51, whereas the command processing circuit 15 is prevented from storing a color code data thereinto. Thus, the handshaking of the command processing circuit 15 with the CPU 4 is controlled by the TR flag.

At block SP112, a value k2 is added to or subtracted from the data stored in the SXA register 47. The value k2 is determined in the same manner as described for the processing at the block SP12 of FIG. 11. And the processing proceeds to block SP113. The processing at the block SP113 and the processing at block SP114 are identical to those at the blocks SP13 and SP14 of FIG. 11.

At block SP115, a determination of whether the flip-flop FF1 is in a set state is made. And if the determination result is "NO", the processing returns to the block SP104 to continue the reading of color code data of elements on the current row. On the other hand, if the determination result at the block SP115 is "YES", the processing proceeds to block SP116 at which the flip flop FF1 is reset and at the same time the contents of the SX and NX registers 41 and 45 are transferred to the SXA and NXA registers 47 and 49, respectively. Then, the processing proceeds to block SP117. The processings at the block SP117 and the succeeding blocks SP118 and SP119 are identical to those at the blocks SP17, SP18 and SP19, respectively.

At block SP120, the data in the SY register 42 is incremented or decremented by one in a manner described for the block SP20 of FIG. 11, and at the next block SP121 the flip-flop FF2 is set if the contents of the SY register 42 is negative, i.e., if the y coordinate of the element whose color code will be readout next is disposed outside of and upwardly of the active display area of the screen. And the processing proceeds to block SP123. At the block SP123, it is determined whether the flip-flop FF2 is in a set state, and if the determination result is "NO", the processing returns to the block SP104 to begin the reading of color code data of elements of the next row. On the other hand, if the determination result at the block SP123 is "YES", the processing proceeds to block SP124 at which the CE flag is reset, and the processing of this command terminates at block SP125.

As described above, according to the processing shown in FIG. 14, the CPU 4 can sequentially read color codes from a memory area corresponding to a desired display area of the screen in one of the orders shown in FIGS. 13-(*a*) to 13-(*d*).

High-speed Move from VDP to VRAM

The operation of this video display control system when a high-speed move command for transferring a color code data stored in the command processing circuit 15 to the VRAM 2 (herein after referred to as "HMMV command") is executed will now be described with reference to a flow chart shown in FIG. 16. When the HMMV command is outputted from the CPU 4 to the command processing circuit 15 with one byte of color code data, the command processing circuit 15 stores the color code data into each address of a memory area in the VRAM 2 defined in accordance with a selected display area on the screen, whereby the display area on the screen is painted out in a color or colors represented by the color code data.

Figure 16:
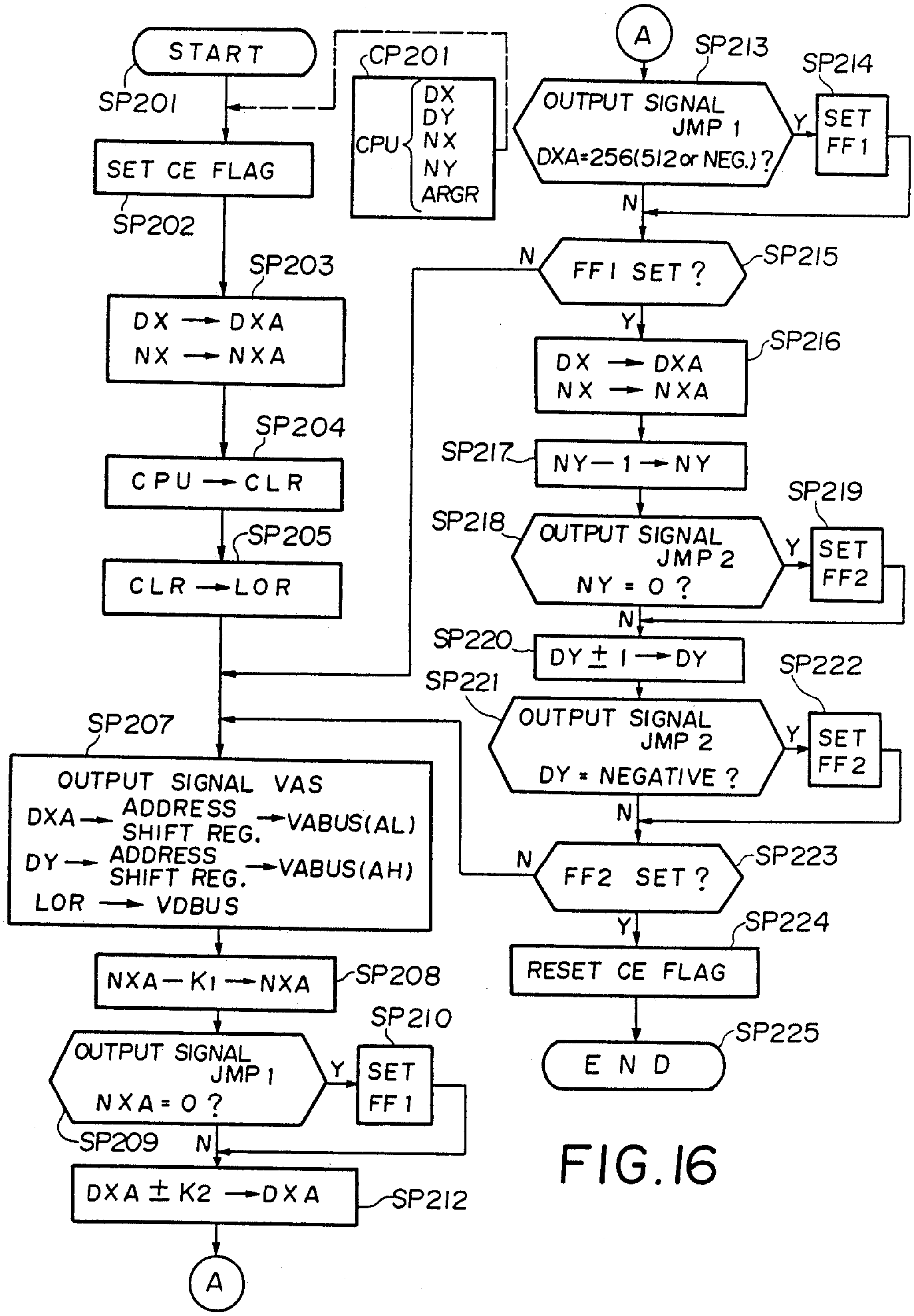
FIG. 16 is a block diagram of the processing of a high-speed move command for transferring a color code data stored in the command processing circuit 15 to the VRAM 2 (HMMV command)

At block CP201 in FIG. 16, the CPU 2 defines a memory area in the VRAM 2, into each address of which a color code data of the same kind is stored, in a manner described for the processing at the block CP1 of FIG. 11. The CPU 2 then stores a command data representative of the HMMV command into the command register 20 at block SP201, whereupon the flag CE is set by the flag control circuit 34 (block SP202). And the processing proceeds to block SP203. The processings at this block SP203 and the next block SP204 are identical to those at the block SP3 and the block SP4 of FIG. 11, respectively. In the case where it is desired to paint out the selected display area on the screen in a single color in any one of the modes G IV, G V and G VI, color codes contained in the byte outputted from the CPU at the block SP204 must be of the same kind. Upon completion of the processing of the block SP204, the processing proceeds to block SP205 at which the color code data in the CLR register 51 is transferred to the LOR register 50. Thereafter, the processings of blocks SP207 to SP225 are sequentially carried out in a manner described for the processings of block SP7 to SP25 of FIG. 11. The processings of the blocks SP207 to SP225 are different from those of blocks SP7 to SP25 only in that the processing proceeds from the block SP215 to SP207 if the determination result at the block SP215 is "NO" and in that the processing proceeds from the block SP223 to the block SP207 if the determination result at the block SP223 is "NO".

As described above, according to the processing shown in FIG. 16, the color code data stored in the command processing circuit 15 is written into each address of the predetermined area of the VRAM 2 in one of the orders shown in FIGS. 13-(*a*) to 13-(*d*).

Logical Move from CPU to VRAM

The operation of the video display control system when a logical operation and move command for storing into the VRAM 2 logically operated ones of a block of color codes from the CPU 4 (hereinafter referred to as "LMMC command") is executed will now be described. In the processing of the LMMC command, color codes are transferred from the CPU 4 to the command processing circuit 15 on a bit basis, i.e., on a two, four or eight-bit basis depending on the display mode, each of the color codes being right-justified in a respective one of the bytes. At the same time, color codes are read from a selected area of the VRAM 2. Each of the color codes outputted from the CPU 4 and a respective one of the color codes read from the VRAM 2 are subjected to a logical operation, and the result of the logical operation is stored in the selected area of the VRAM 2.

The processing of the LMMC command will now be described with reference to FIG. 17 in which a flow chart of a part of the processing of the LMMC command is shown. The processing of the LMMC command other than the part shown in FIG. 17 is identical to that shown in FIG. 11, and therefore the description thereof will not be made here.

Figure 17:
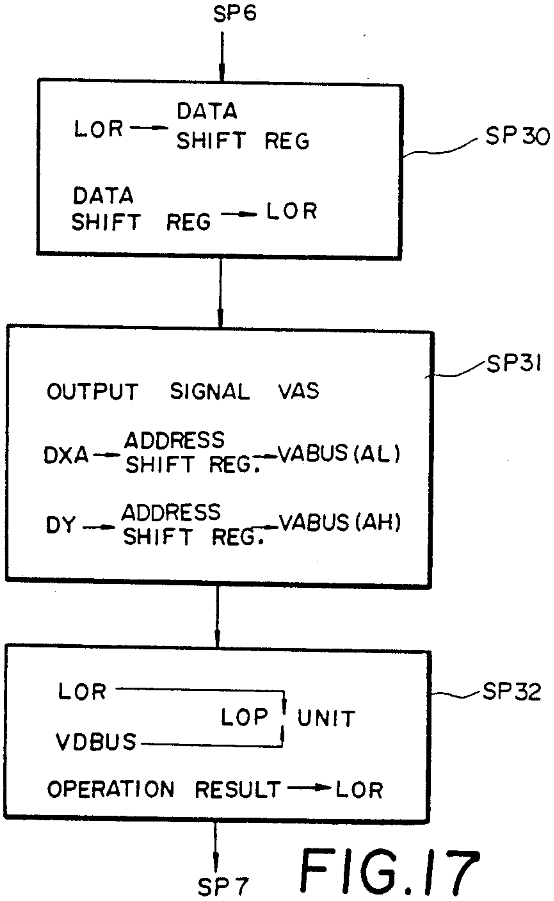
FIG. 17 is a flow chart of a part of the processing of a logical operation and move command for storing into the VRAM 2 logically operated ones of a block of color codes outputted from the CPU 4.

Upon completion of the processing at the block SP6 of FIG. 11, the processing proceeds to block SP30 of FIG. 17, at which the contents of the LOR register 50 is loaded into the data shift register 54. The loaded data is then shifted in accordance with both of the display mode and the contents of the DXA register 48 in the following manner.

FIGS. 18-(*a*) to 18-(*c*) show color codes transferred from the CPU 4 in the G IV (G VI), G V and G VII modes, respectively wherein hatched areas represents the color codes. Assuming that a transfer of color codes is now being carried out in the G IV (G VII) mode. In this G IV (G VI) mode, color codes are stored in the still image data area 2*a* of the VRAM 2 in the order shown in FIG. 2-(*c*). And therefore, to transfer a color code to the upper four bits of an address of the area 2*a*, the color code outputted from the CPU 4 (FIG. 18-(*a*)) should previously be shifted by four bits to the left, i.e., to the higher-order bits. The determination of whether the shift operation is necessary is made with respect to each of color codes in accordance with x coordinate of element of the color code. More specifically, the shift operation is made if the x coordinate of element of the color code is an even number, while the shift operation is not made if the x coordinate is an odd number. The determination of whether the x coordinate is an even number or an odd number can be made in accordance with the LSB of the contents of the DXA register 48. And therefore, the data shift register 54 determines the number of shifts to be effected in accordance with the mode selection data in the mode register 31 and also determines whether the shift operation should be made in accordance with the LSB of the contents of the DXA register 48.

In the case of the G V mode, color codes are stored in the still image data area 2*a* of the VRAM 2 in the order shown in FIG. 3-(*c*). In this G V mode, four consecutive color codes are stored in one address of the area 2*a* as shown in FIG. 19, the first one of the color codes being stored in an area a (bits D7 and D6) of the address, the second one in an area b (bits D5 and D4) of the address, the third one in an area c (bits D3 and D2) of the address, and the last one in an area d (bits D1 and D0) of the address. And therefore, to transfer a color code to the area a, the color code outputted from the CPU 4 (FIG. 18-(*b*) should previously be shifted by six bits to the left. Similarly, to transfer color codes to the areas b and c, the color codes outputted from the CPU 4 should be shifted by four bits and two bits, respectively, to the left. One of the areas a to d is selected as an area to which the color code is to be transferred in accordance with the contents of the lowermost two bits of the DXA register 48. More specifically, the area a is selected when the lowermost two bits D1 and D0 of the DXA register 48 are "0 and "0", while the area b is selected when the bits D1 and D0 are "0" and "1". Similarly, the area c is selected when the lowermost two bits D1 and D0 are "1" and "0", while the area d is selected when the bits D1 and D0 are "1" and "1". And therefore, the data shift register 54 decides the number of shifts to be performed in accordance with the mode selection data in the mode register 31 and the contents of the bits D1 and D0 of the DXA register 48.

In the case of G VII mode, a color code is composed of eight bits. And therefore, each of color codes outputted from the CPU 4 can be transferred to a respective one of addresses in the still image data area *2a* without any shift operation.

At the block SP30, the color code which has been subjected to the above-described shift operation is stored into the LOR register 50. Then, the processing proceeds to block SP31.

At the block 31, a color code contained in the address, to which a result of a logical operation will be stored, is readout in the following manner. First, the address shift register 52 produces an address data indicative of an address in the still image data area 2 in a manner described for the processing at the block SP7 of FIG. 11 (see the equations (1) to (4)). In this case, the instruction decoder 26 shown in FIG. 6 outputs the signal VAS to the VRAM access controller 28 to prevent a contention of access to the VRAM 2 with the image processing circuit 10. And if the signal S1 is not active, i.e., if there is no contention of access to the VRAM 2, a color code is read from the address indicated by the address data and is outputted onto the VDBUS 58.

At block SP32, the LOP unit 60 performs a logical operation on the pair of color codes present respectively on the VDBUS 58 (the color code read from the VRAM 2) and in the LOR register 50 (the color code transferred from the CPU 4). The LOP unit 60 then stores the result of the operation into the LOR register 50. The LOP unit 60 is designed so as to perform any one of logical operations such as AND, OR, NOT and EXCLUSIVE OR, and selects one of them in accordance with the output of the LOP decoder 30. When performing a logical operation, the LOP unit 60 masks off the bits of the data on the VDBUS 58 other than those corresponding to the current color code to prevent from alteration in the following manner. It is assumed that the result of the operation is to be stored in the area a of the address shown in FIG. 19. In this case, the color code from the CPU 4 is shifted by six bits to the left in the data shift register 54 at the block SP30. And the contents of the LOR register 50 immediately after the processing of the block SP30 are shown in FIG. 20. The contents of the LOR register 50 and the data on the VDBUS 58 are subjected to a logical operation at the block SP32, in this case however, the data in the areas b to d should not be altered since these areas are not ones to which the result of the operation is stored. The LOP unit 60 therefore masks off the the bits D0 to D5 of the LOR register 50 and then performs a logical operation on the data in the LOR register 50 and on the VDBUS 58. And therefore, the contents of the bits D0 to D5 of the LOR register 50 are identical to those on the VDBUS 58 even after the processing of the block SP32 has been completed. The bits of the LOR register to be masked off are determined in accordance with the mode selection data in the mode register 31 and the contents of the lowermost two bits of the DXA register 48. A masking processing similar to the above is carried out in the G IV (G VI) mode, however in the G VII mode such a masking processing is not carried out since each color codes is composed of eight bits in the G VII mode.

Upon completion of the processing at the block SP32, the processing proceeds to the block SP7 of FIG. 11 at which the data in the LOR register 50 is stored into the address in the still image data area *2a*. And thereafter, the processings shown in FIG. 11 are sequentially carried out as described for the HMMC command. Incidentally, in the processing of this LMMC command, both of the values k1 and k2 at the blocks SP8 and SP 12 are "1" in any display modes. The reason for this is that in the case of the LMMC command color codes are transferred on an element basis regardless of the display modes.

As described above, in the processing of the LMMC command, color codes are transferred on an element basis so that a display area whose color codes are transferred can be defined without any restriction. In addition, the color codes stored in a memory area corresponding to the display area are results of logical operations performed on the color codes from the CPU and those previously stored in the VRAM, so that a variety of display effects are achieved.

Logical Move from VRAM to CPU

The operation of the video display control system when a logical operation and move command for transferring a block of color codes from the VRAM 2 to the CPU 4 or to an external device via the CPU 4 (hereinafter referred to as "LMCM command") is executed will now be described. In the processing of the LMMC command, color codes are transferred from the VRAM 2 to the CPU 4 on a bit basis, i.e., on a two, four or eight-bit basis depending on the display mode, each of the color codes delivered to the CPU 4 being right-justified in a respective one of the bytes.

The processing of the LMCM command will now be described with reference to FIG. 21 in which a flow chart of a part of the processing of the LMCM command is shown. The processing of the LMCM command other than the part shown in FIG. 21 is identical to that shown in FIG. 14, and therefore the description thereof will not be made here.

Figure 14:
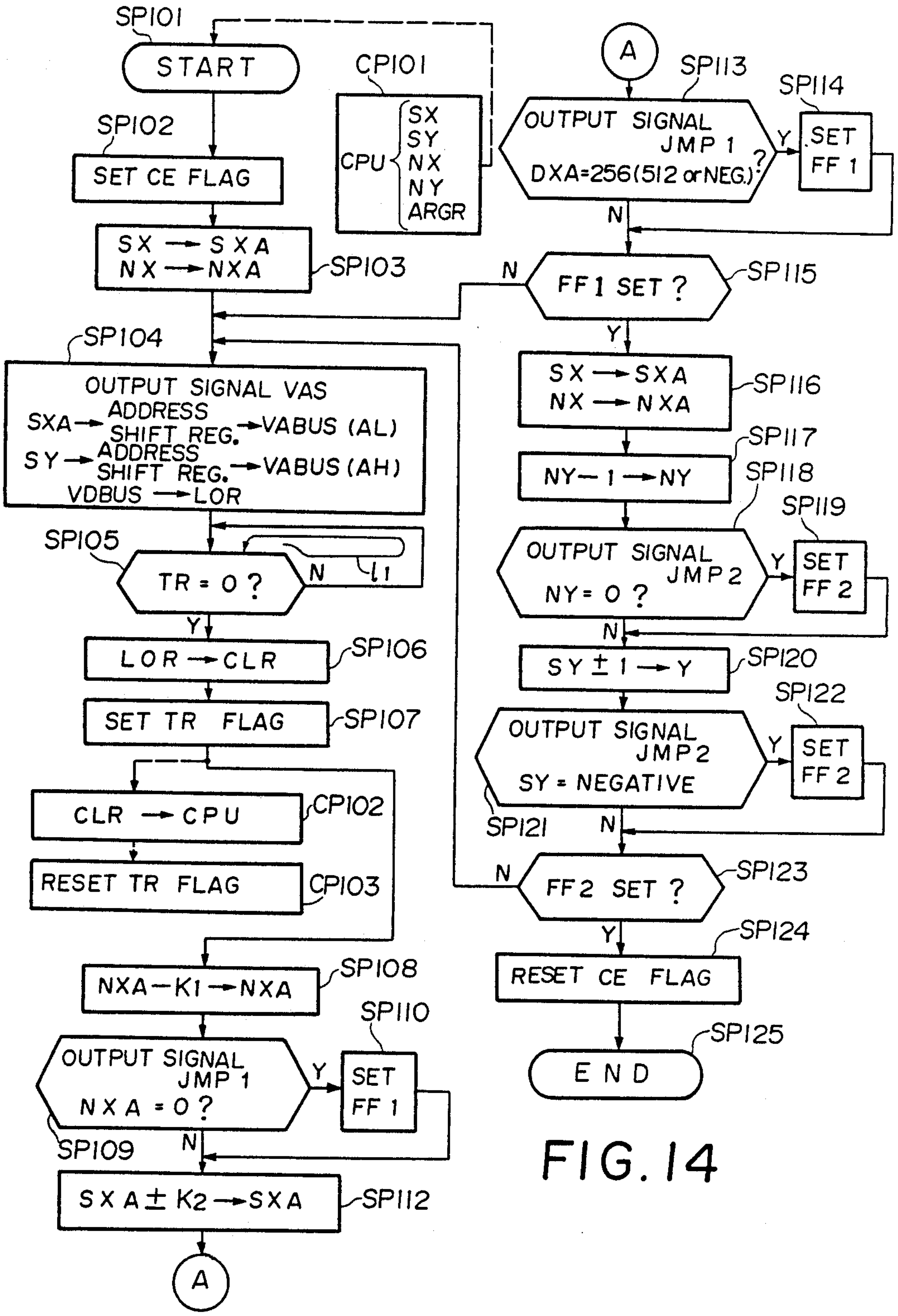
FIG. 14 is a block diagram of the processing of a high-speed move command for transferring a block of color codes from the VRAM 2 to the CPU 4 (HMCM command)

Upon completion of the processing at the block SP104 of FIG. 14, the processing proceeds to block SP130 of FIG. 21, at which the contents of the LOR register 50 is loaded into the data shift register 54. The loaded data is then shifted in accordance with both of the display mode and the contents of the SXA register 47 in the following manner.

In the case of the G V mode, color codes are stored in the still image data area *2a* in the order shown in FIG. 3-(*c*). In this G V mode, four consecutive color codes are stored in one address of the area *2a* as shown in FIG. 22. And therefore, to transfer a color code from an area a of the address to the CPU 4, the color code read from the area *2a* should previously be shifted by six bits to the right, i.e., to the lower-order bits. Similarly, to transfer color codes from areas b and c of the address of the area *2a* to the CPU 4, the color codes read from the address should be shifted by four bits and two bits, respectively, to the right. One of the areas a to d is selected as an area, from which the color code is to be transferred, in accordance with the contents of the lowermost two bits of the SXA register 47. More specifically, the area a is selected when the lowermost two bits D1 and D0 of the SXA register 47 are "0" and "0", while the area b is selected when the bits D1 and D0 are "0" and "1". Similarly, the area c is selected when the lowermost two bits D1 and D0 are "1" and "0", while the area d is selected when the bits D1 and D0 are "1" and "1". And therefore, the data shift register 54 determines the number of shifts to be performed in accordance with the mode selection data in the mode register 31 and the contents of the bits D1 and D0 of the SXA register 47.

In the case of G VII mode, a color code is composed of eight bits. And therefore, each color code read from the area 2a can be transferred to the CPU 4 without any shift operation.

At the block SP130, the color code which has been subjected to the above-described shift operation is stored into the LOR register 50. Then, the processing proceeds to the block SP105 of FIG. 14. And thereafter, the processings shown in FIG. 14 are sequentially carried out as described for the HMCM command. Incidentally, in the processing of this command, both of the values k1 and k2 at the blocks SP108 and SP112 are "1" in any display modes. The reason for this is that in the case of the LMCM command color codes are transferred on an element basis regardless of the display modes.

As described above, in the processing of the LMCM command, color codes are transferred on an element basis so that a display area whose color codes are transferred can be defined without any restriction.

Logical Move from VDP to VRAM

The operation of the video display control system when a logical operation and move command for transferring to the VRAM 2 logically operated one of a color code stored in the command processing circuit 15 (hereinafter referred to as "LMMV command") is executed will now be described. In the processing of the LMMV command, a byte of data including one color code is transferred from the CPU 4 to the command processing circuit 15, the color code being composed of two, four or eight bits depending on the display mode and right-justified. At the same time, color codes are sequentially read from a selected area of the VRAM 2. The color code outputted from the CPU 4 and each of the color codes read from the VRAM 2 is subjected to a logical operation, and each result of the operations is stored in a respective one of addresses of the selected area of the VRAM 2.

The processing of the LMMV command will now be described with reference to FIG. 23 in which a flow chart of a part of the processing of the LMMV command is shown. The processing of the LMMV command other than the part shown in FIG. 23 is identical to that shown in FIG. 16, and therefore, the description thereof will not be made here.

Upon completion of the processing at the block SP205 of FIG. 16, the processing proceeds to block SP230 of FIG. 23, at which the contents of the LOR register 50 is loaded into the data shift register 54. The loaded data is then shifted in accordance with both of the display mode and the contents of the DXA register 48 in the same manner as described for the processing of the LMMC command at the block SP30 of FIG. 17. And the color code which has been subjected to the above-described shift operation is stored into the LOR register 50. Then, the processing proceeds to block SP231.

At the block 231, an address data is formed in a manner described for the processing at the block 31 of FIG. 17 and is outputted onto the VABUS 59 to read a color code contained in the address, to which a result of a logical operation should be stored. And the processing proceeds to block SP232.

At block SP232, the LOP unit 60 performs a logical operation on the pair of color codes being present respectively on the VDBUS 58 (the color code read from the VRAM 2) and in the LOR register 50 (the color code transferred from the CPU 4). The LOP unit 60 then stores the result of the logical operation into the LOR register 50.

Upon completion of the processing at the block SP232, the processing proceeds to the block SP207 of FIG. 16 at which the data in the LOR register 50 is stored into the same address in the still image data area 2a of the VRAM 2. And thereafter, processings similar to those shown in FIG. 16 are sequentially carried out in a manner described for the HMMV command. The processing of this command differs from that of the HMMV only in that the processing proceeds from the block SP215 to the block SP205 if the determination result at the block SP215 is "NO" and in that the processing proceeds from the block SP223 to the block SP205 if the determination result at the block SP223 is "NO". Incidentally, both of the values k1 and k2 at the blocks SP208 and SP212 are "1" in any display modes. The reason for this is that in the case of the LMMV command color codes are transferred on an element (or a dot) basis regardless of the display modes.

As described above, in the processing of the LMMV command, color codes are transferred on an element basis so that a display area whose color codes are transferred can be defined without any restriction. In addition, each color code stored in a memory area corresponding to the display area is the result of a logical operation performed on the color code from the CPU and each of color codes previously stored in the VRAM, so that a variety of display effects can be achieved. For example, by executing this LMMV command, colors of a still image on the screen can be changed without altering pattern of the image. Also, by this command, only a pattern in a specific color in a still image can be altered.

PSET

The operation of the video display control system when a special command for storing into the VRAM 2 a color code obtained as a result of a logical operation on a color code outputted from the CPU 4 and a color code read from the VRAM 2 (hereinafter referred to as "PSET command") is executed will now be described. In the processing of the PSET command, a byte of data including one color code is transferred from the CPU 4 to the command processing circuit 15, the color code being composed of two, four or eight bits depending on the display mode and right-justified in the byte. At the same time, a color code is read from a selected address in the VRAM 2. The color code outputted from the CPU 4 and the color code read from the VRAM 2 is subjected to a logical operation, and the result of the logical operation is stored in the same addresses of the the VRAM 2.

Figure 24:
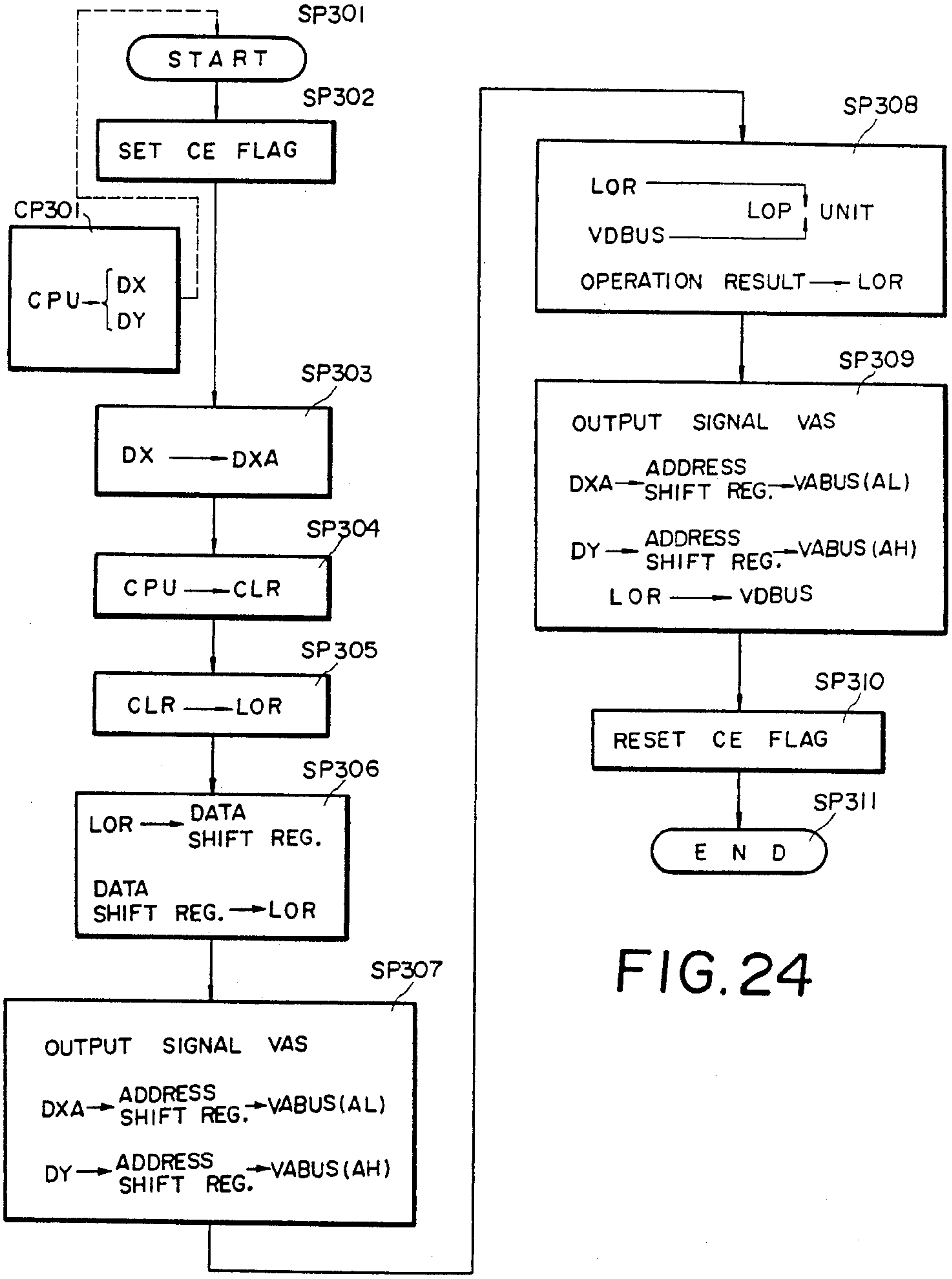
FIG. 24 is a flow chart of the processing of a special command for storing into the VRAM 2 a color code obtained as a result of a logical operation effected on a color code outputted from the CPU 4 and a color code read from the VRAM 2 (PSET command)

The processing of the PSET command will now be described with reference to FIG. 24 in which a flow chart of the processing of the PSET command is shown. The processing of the PSET command is very similar to the processing of the LMMV command except that the reading of a color code and the storing of the result of the logical operation is made with respect to only one address in the VRAM 4.

At block CP301, the CPU 4 stores x and y coordinates of a display element (or a display dot) on the screen of the display unit 3 whose color code is to be subjected to a logical operation, into the DX and DY registers 43 and 44. The CPU 4 then stores data representative of the PSET command into the command register 20 (block SP301), whereby the CE flag is set (block SP302). The x coordinate of the element stored in the DX register 43 is loaded onto the DXA register 48 at block SP303. At block SP304, the CPU 4 stores a color code into the CLR register 51, and the stored color code is then transferred to the LOR register 50 (block SP305). At block SP306, the color code in the LOR register 51 is subjected to a shift operation in a manner described for the block SP130 of FIG. 21. At block SP307, an address data indicative of a memory address corresponding to the element on the screen is formed and is outputted onto the VABUS 59 to read a color code in the address in a manner described for the block SP7 of FIG. 11. The color code read from the address and the color code in the LOR register 51 are subjected to a logical operation defined by the command data in the command register 20, and the result of the logical operation is loaded into the LOR register 51 (SP308). At block SP309, data indicative of the address in the VRAM 2 is again formed and is outputted onto the VABUS to store the contents of the LOR register 51 into the same address. At block SP310, the CE flag is reset to inform the CPU 4 that the processing of this PSET command is completed, and the processing terminates at block SP311.

As described above, according to the processing of this PSET command, an element can be displayed on the screen in a desired color by outputting x and y coordinates of the element on the screen and by subsequently outputting a color code of the desired color. Thus, a complicated line such as a circle and a parabola can be described on the screen by repeatedly executing the PSET command with x and y coordinates being varied in accordance with the function of the line. In addition, each color code stored in a memory address corresponding to the display element is the result of a logical operation performed on the color code from the CPU and the color code previously stored in the address, so that a variety of display effects can be achieved.

LINE

The operation of this video display control system when a special command for describing a straight line on the screen (hereinafter referred to as "LINE command") is executed will now be described with reference to FIG. 25 in which a flow chart of the processing of the LINE command is shown. In the processing of this LINE command, the LSB D0 of the argument register 32 is used for storing an additional parameter XM to be supplied to the command processing circuit 15, as shown in FIG. 26.

Assuming that it is desired to describe a straight line L1 lying between an element (or a dot) P1 (start point) and an element (or a dot) P2 (end point) on the screen, as shown in FIG. 27, the CPU 4 stores x and y-coordinates of the start point P1 into the DX and DY registers 43 and 44, respectively, at block CP401. It is here defined that the greater one of the difference between the x coordinates of the points P1 and P2 (hereinafter referred to as "x-difference") and the difference between the y coordinates of the points P1 and P2 (hereinafter referred to as "y-difference") is Maj, and that the smaller one of the x and y-differences is Min. At this block CP401, the CPU 4 also stores the Maj and Min into the NX and NY registers 45 and 46, respectively. In the case of the straight line L1 shown in FIG. 27, the x-difference corresponds to the Maj and the y-difference corresponds to the Min. The CPU 4 then stores a pair of bit data DIRX and DIRY into the third and fourth bits D2 and D3 of the argument register 32, respectively (FIG. 26-(*a*)). The DIRX bit must be "1" if the x-coordinate of the point P2 is smaller than that of the point P1, and must be "0" if the x coordinate of the point P2 is greater than that of the point P1. Similarly, the DIRY bit must be "1" if the y coordinate of the point P2 is greater than that of the point P1, and must be "0" if the y coordinate of the point P2 is smaller than that of the point P1. In the case of the line L1 shown in FIG. 27, both of the DIRX and DIRY bits must therefore be "0". Incidentally, any one of lines L2, L3 and L4 indicated in dot and dash lines in FIG. 27 can be selected by properly setting these DIRX and DIRY bits. The CPU 4 also stores into the bit D0 the bit data XM which is "0" when the x-difference is the Maj, and "1" when the x-difference is the Min.

The algorism for calculating x, y coordinate of each element (or dot) of the line L1 will now be briefly described with reference to FIG. 28 in which the line L1 to be described is shown together with elements actually displayed and representing the line L1. At the beginning, an element is displayed at the start point P1 (x, y), and then the subsequent elements are displayed in accordance with the value (Min/Maj) in the following manner, the value (Min/Maj) representing the slope of the line L1.

(a) It is determined whether (Min/Maj) is equal to or greater than "½", i.e., whether $(\mathrm{Min}-\mathrm{Maj}/2)=Q$ is positive. And if the result Q of the above subtraction is positive, both of the coordinates (x, y) are incremented by "1" and an element is displayed (see the broken lines in FIG. 28). Then, a value M $(M=\mathrm{Maj}-\mathrm{Min})$ is subtracted from the result Q and it is determined whether the result Q′ of this subtraction is positive. If it is determined that the result Q′ is positive, both of the coordinates (x, y) are again incremented and an element is displayed.

(b) On the other hand, if the result Q or Q′ is negative, only the x coordinate is incremented and an element is displayed (see the dot and dash lines in FIG. 28). Then, Min is added to the result Q or Q′ and a determination of whether the result of this addition is positive or negative is made.

The above processings (a) and (b) are sequentially and selectively performed in accordance with the results Q and Q′, whereby elements are displayed along the line L1 as shown in FIG. 28.

Figure 29:
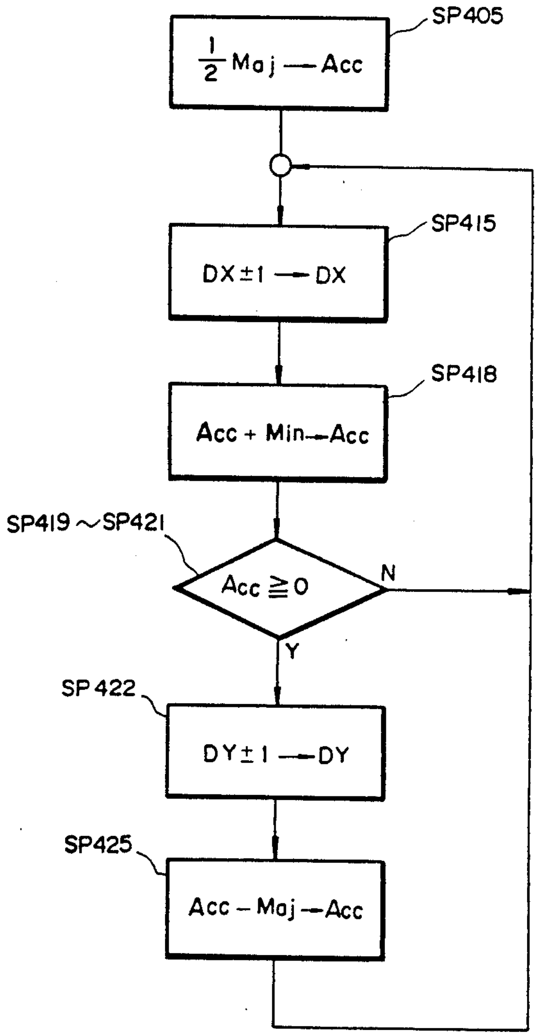
FIG. 29 is a flow chart of a part of the processing of the LINE command in which the processing blocks necessary for the calculation of x and y coordinates of dots of a straight line are shown.

FIG. 29 shows a flow chart of the above processings (a) and (b). This flow chart includes only particular ones of the processing blocks of FIG. 25 which relate to the algorism. In the flow chart, the register ACC 61 is supplied with the above-described result Q or Q′. At block SP415, data in the DX register 43 is decremented by "1" only when the DIRX bit is "1", while data in the DY register 44 is decremented by "1" at block SP422 only when the DIRY bit is "1".

Figure 25:
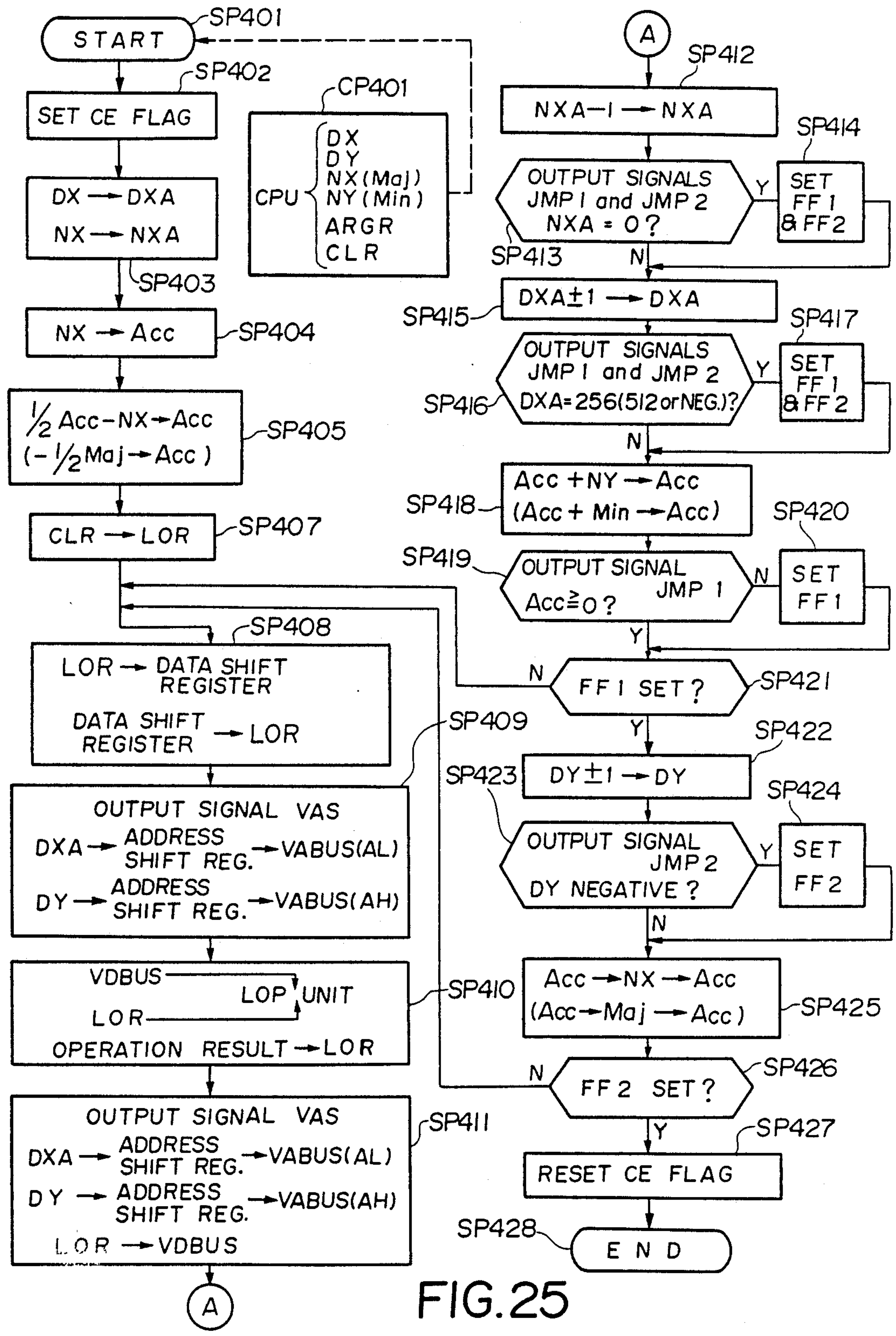
FIG. 25 is a flow chart of the processing of a special command for describing a straight line on the screen (LINE command)

At the block CP401 of FIG. 25, the CPU 4 also stores a color code indicative of color of the line L1 into the CLR register 51, the color code being composed of two, four or eight bits depending on the current display mode. The CPU 4 then stores a command data of the LINE command into the command register 20, whereupon the processing of this LINE command is commenced (block SP401). At block SP402, the flag control circuit 34 sets the CE flag in the flag register 33 to inform the CPU of the beginning of the processing, and at block SP403 the contents of the DX and NX registers 43 and 45 are transferred to the DXA and NXA registers 48 and 49, respectively. The contents of the NX register 45 (Maj) is also transferred to the ACC register 61 at block SP404. At block SP405, the contents of the ACC register 61 is shifted downwardly by one bit to divide the contents thereof by two, and the shift result is supplied with the contents of the NX register 45 to the addition and subtraction circuit 53. The addition and subtraction circuit 53 subtracts the contents of the NX register 45 from the shift result of the ACC register 61 and stores the result of this subtraction into the ACC register 61.

At block SP407, the color code in the CLR register 51 is transferred to the LOR register 50, and thereafter the processings of blocks SP408 to SP410 are sequentially carried out in a manner described for the blocks SP30 to SP32 of FIG. 17 (LMMC command), whereby the contents of the LOR register 50 is replaced by the result of a logical operation effected on the color code previously stored in the LOR register 50 and a color code read from a memory address indicated by the contents of the DXA and DY registers 48 and 44. The result of the logical operation is then stored into a memory address indicated by the contents of the DXA and DY registers 48 and 44 at block SP411. At block SP412, the contents of the NXA register 49 ( Maj) is decremented by one, and a determination of whether the contents of the NXA register 49 is "0", i.e., whether the description of the line L1 is completed, is made at blocks SP413 and SP414. At the SP414, both of the flip-flop FF1 and FF2 are set when the contents of the NXA register 49 is "0". At block SP415, the contents of the DXA register 48 is incremented or decremented in accordance with the state of the DIRX bit, and at blocks SP416 and SP417 it is determined whether the x coordinate is within the active display area on the screen. When it is determined that the x coordinate is not within the active display area, both of the flip-flop FF1 and FF2 are set at the block SP417.

At block SP418, the addition and subtraction circuit 53 adds the contents of the ACC register 61 to the contents of the NY registers 46 ( Min), and stores the addition result into the ACC register 61. At block SP419, the instruction decoder 26 outputs the signal JMP1 and determines whether the signal <—> is outputted from the calculation-result determination circuit 55, i.e., whether the contents of the ACC register 61 is positive. The processing proceeds to block SP421 if the determination result is "YES", while the processing proceeds to block SP420 to set the flip-flop FF1 if the determination result is "NO". At the block SP421, it is determined whether the flip-flop FF1 is set, and the processing returns to the block SP408 if the determination result is "NO", and otherwise the processing proceeds to block SP422. At the block SP422, the contents of the DY register 44 is incremented or decremented in accordance with the state of the DIRY bit and at the next block SP423 it is determined whether the contents of the DY register 44 is negative. When the determination result is "YES", the flip-flop FF2 is set, and the processing proceeds to block SP425.

At the block SP425, the addition and subtraction circuit 53 subtracts the contents of the NX register 45 from the contents of the ACC register 61, and stores the subtraction result into the ACC register 61. At the next block SP426, it is determined whether the flip-flop FF2 is in a set state. The processing returns to the block SP408 if the determination is "NO", while the processing proceeds to block SP427 to terminate this LINE command if the determination is "YES".

Incidentally, in the case where the Maj is an x-difference, the XM bit must be "1", so that the blocks SP415 and SP422 in the flow chart are replaced with each other.

As described above, according to the processing of this LINE command, a line can be described only by supplying to the command processing circuit 15 x and y coordinates of the start point, x and y-differences between the start and end points, and the signs of the x and y-differences, so that the CPU is released from executing complicated programs. This video display control system can be used even in a device in which a high speed description of lines is needed. In addition, each color of elements of a line described in accordance with the processing of this LINE command is a result of a logical operation performed on a color code outputted from the CPU 4 and a color code read from the VRAM 2, and therefore a variety of display effects can be achieved.

Search

The operation of this video display control system when a special command for searching for a boundary between two display areas (hereinafter referred to as "SRCH command") is executed will now be described. The principle of detecting a boundary between two display areas on the screen will be first described with reference to FIG. 30 in which two adjacent areas Q1 and Q2 displayed respectively in red and blue are shown. When it is desired to detect x and y coordinates of an element (or a dot) P1 (boundary point) on the boundary between the areas Q1 and Q2, the CPU 4 first outputs to the command processing circuit 15 x and y coordinates of an element (or a dot) P0 within the display area Q1 together with a color code representative of blue (or red). The command processing circuit 15 sequentially reads color codes of elements of the row, on which the point P0 locates, from the dot P0 in the direction of the point P1, and compares each of the read color codes with the color code outputted from the CPU. And if the read color code coincides with (or differs from) the color code outputted from the CPU, the command processing circuit 15 informs the CPU of the detection of the boundary. In the processing of the SRCH command, the second bit D1 of the argument register 32 is used for storing a bit data NE, as shown in FIG. 31. If the bit data NE is "0" and when a color code read from the VRAM 2 coincides with the color code outputted from the CPU 4, the element corresponding to the color code read from the VRAM 2 is decided to be an element on the boundary. On the other hand, if the bit data NE is "1" and when a color code read from the VRAM 2 differs from the color code outputted from the CPU 4, the element corresponding to the color code read from the VRAM 2 is decided to be an element on the boundary.

Figure 32:
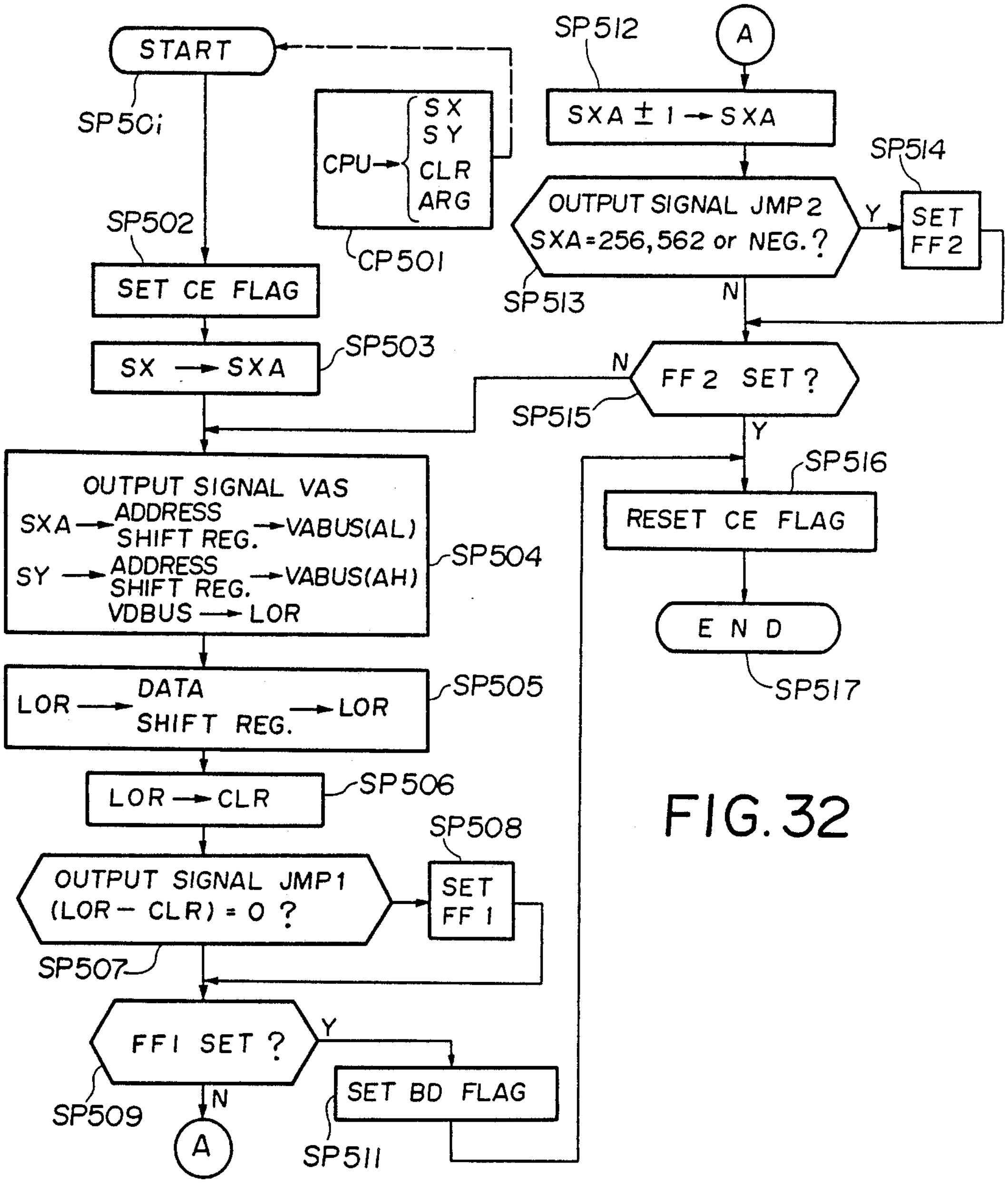
FIG. 32 is a block diagram of the processing of a special command for searching for a boundary between two display areas on the screen (SRCH command)

The processing of the SRCH command will now be described with reference to a flow chart shown in FIG. 32. At block CP501, the CPU 4 stores x and y coordinates of a start point P0, from which a search operation is commenced, into the SX and SY registers 41 and 42, respectively. The CPU 4 also stores the bit data DIRX and NE into the argument register 32 at its bit D2 and bit D1, respectively. The search operation is carried out from the start point P0 to the right if the bit data DIRX is "0", while the search operation is carried out from the start point P0 to the left if the bit data DIRX is "1". The CPU 4 also stores into the CLR register 51 a color code which is composed of two, four or eight bits depending on the display mode and is right-justified in the byte.

It is assumed that the areas Q1 and Q2 are displayed on the screen in red and blue, respectively, and that the bit data DIRX is set to "0" to carry out the search operation rightwardly from the start point P0. In the case where a color code representative of blue is outputted from the CPU with the bit data NE of "0", a point P1 shown in FIG. 30 is detected as a point on the boundary between the two areas Q1 and Q2. And in the case where a color code representative of red is outputted from the CPU with the bit data NE of "1", the point P1 is also detected as a point on the boundary. On the other hand, if there is another area Q3 displayed in yellow within the area Q1 as indicated by a broken line in FIG. 33, the point P1 is still detected as a point on the boundary in the former case, whereas a point P2 is detected as a point on the boundary between the areas Q1 and Q3 in the latter case. As is appreciated from the foregoing, various kinds of search operations can be achieved in accordance with the contents of the CLR register 51 and the state of the bit data NE. In addition, an outline of the area Q1 (and Q2) can be obtained by changing variously the values of the x and y coordinates of the start point P0 and performing a search in the similar manner with respect to each of the points P0.

After storing the parameters into the SX, SY, CLR and argument registers 41, 42, 51 and 32, the CPU 4 stores data representative of the SRCH command into the command register 20, whereupon the processing of this SRCH command is commenced at block SP501. At block SP502, the flag control circuit 34 sets the CE flag in the flag register 33 to inform the CPU 4 that the processing of the SRCH command is started. At block SP503, the contents of the SX register 41 is transferred to the SXA register 47, and at block SP504 a color code data is readout from a memory address of the VRAM 2 defined by the contents of the SXA and SY registers 47 and 42 in a manner described for the block SP104 of the flow chart of the HMCM command of FIG. 14. At block SP505, the color code data in the LOR register 50 is subjected to a shift operation to right-justify the color code of the current display element (see FIG. 21) in a manner described for the block SP130 of the flow chart of the LMCM command of FIG. 20.

At block SP506, the addition and subtraction circuit 53 subtracts the contents of the CLR register 51 from the contents of the LOR register 50. In this case, the upper four bits of the LOR register 50 are masked off so as not to affect the subtraction operation in the G IV and G VI modes. Similarly, the upper six bits of the LOR register 50 are masked off in the G V mode. At block SP507, the instruction decoder 26 outputs the signal JMP1, and in response to this signal JMP1, the jump controller 23 determines whether the calculation-result determination circuit 55 is outputting the signal <0> i.e., whether the contents of the LOR and CLR registers 50 and 51 are equal to each other. In the case where the bit data NE is "0", the jump controller 23 sets the flip-flop FF1 at block SP508 only when the determination result is "YES", i.e., when the color code read from the still image data area *2a* coincides with that in the CLR register 51. On the other hand, in the case where the bit data NE is "1", the jump controller 23 sets the flip-flop FF1 at the block SP508 only when the determination result is "NO", i.e., when the color code read from the still image data area *2a* of the VRAM 2 differs from that in the CLR register 51. And then the processing proceeds to the next block SP509. At the block SP509, it is determined whether the flip-flop FF1 is in a set state, i.e., whether the boundary is detected. When the determination result is "YES", the BD flag is set at block SP511 and the processing proceeds to block SP516 at which the CE flag is reset to terminate the processing of this SRCH command. On the other hand, when the determination result at the block SP509 is "NO", the processing proceeds to block SP512 at which the contents of the SXA register 47 is incremented when the bit data DIRX is "0" (or decremented when the bit data DIRX is "1") to advance the x-coordinate of the current display element. At blocks SP513, SP514 and SP515, it is determined whether the x coordinate of the next display element is within the active display area on the screen. If the x coordinate of the next element is within the active display area, the processing proceeds to the block SP504 to continue the processing of this SRCH command, and if the x coordinate is outside the active display area the processing proceeds to the block SP516 to terminate the processing of this SRCH command.

The CPU 4 tests the CE and BD flags, and if both of the CE and BD flags are "1", the CPU 4 reads the contents of the SXA and SY registers 47 and 42 to input the x and y coordinates of the detected element.

As described above, according to the processing of the SRCH command, x and y coordinates of an element on a boundary between two display areas can be obtained only by supplying to the command processing circuit 15 x and y coordinates of a start point, a bit data representative of the direction of the search operation and a color code to be compared.

PINT

The operation of this video display control system when a special command for reading a color code of a display element (or a display dot) on the screen (hereinafter referred to as "PINT command") is executed will now be described.

Figure 34:
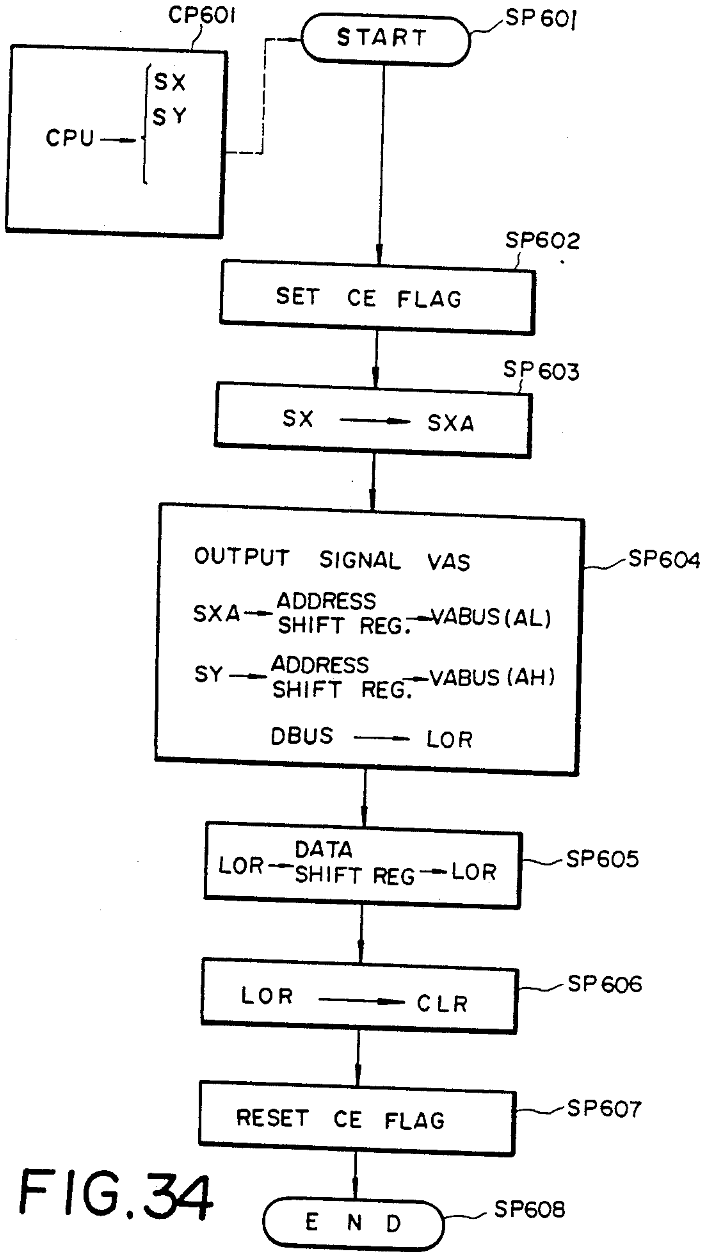
FIG. 34 is a flow chart of the processing of a special command for reading a color code of a display element on the screen (PINT command).

At block CP601 of FIG. 34, the CPU 4 outputs x and y-coordinates of an element, whose color code is to be read from the VRAM 2, to the SX and SY registers 41 and 42, respectively. The CPU 4 subsequently outputs data representative of the PINT command to the command register 20 whereupon the processing of this PINT command is started at block SP601. Blocks SP602 to SP606 of the flow chart shown in FIG. 34 are identical to the blocks SP501 to SP506, respectively. And upon completion of the processing of the block SP606, the processing proceeds to block SP607 at which the CE flag is reset to terminate the processing of this PINT command. The CPU tests the CE flag, and if the CE flag is reset the CPU reads the color code in the CLR register 51.

According to the processing of the PINT command, the CPU 4 can read a color code of an element on the screen from a corresponding memory location of the VRAM 2 only by outputting x and y coordinates of the element and the command data to the command processing circuit 15.

What is claimed is:

1. A video display control system for displaying a video image on a screen of a video display unit which includes a plurality of display elements comprising:

(a) memory means, having a plurality of memory locations, each said memory location corresponding to respective display element group each said display element group including at least one of said plurality of display elements on the screen; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, and (iii) memory accessing means for accessing said first memory location in accordance with said first address data.

2. A video display control system for displaying a video image on a screen of a video display unit which includes a plurality of display elements comprising:

(a) memory means, having a plurality of memory locations, each said memory location corresponding to a respective display element group, each said display element group including at least one of said plurality of display elements on the screen; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, wherein said address generating means comprises instruction memory means for storing a predetermined instruction and control means responsive to said area information for executing said instruction to generate said first address data, and (iii) memory accessing means for accessing said first memory location in accordance with said first address data.

3. A video display control system according to claim 2, wherein said screen is composed of M columns and N rows of display elements, said display area defined by said area information including X columns and Y rows of display elements, where $1 \leq X \leq M$ and $1 \leq Y$ and $\leq N$.

4. A video display control system according to claim 1 or claim 2, wherein said display control means further comprises a second register for receiving an image data, said memory accessing means writing said image data received by said second register into said memory location indicated by said first address data.

5. A video display control system according to claim 4, wherein said image data is composed of a color code or codes representative of a color or colors of a display element or elements of said one of display element group or groups.

6. A video display control system according to claim 2, wherein said address generating means further generates, in accordance with said area information, second address data indicative of the remainder of said plurality of memory locations, said memory accessing means further accessing the remainder of said plurality of memory locations in accordance with said second address data.

7. A video display control system according to claim 6, wherein memory locations indicated by said first and second address data among said plurality of memory locations store a plurality of first image data in advance and said display control means further comprises second register means for receiving a second image data, and operation means, said memory accessing means further reading each of said plurality of first image data from said memory locations indicated by said first and second address data, said operation means effecting a certain operation on each of said plurality of first image data and said second image data to output third image data represented by each result of said operations, said memory accessing means further writing each of said third image data into a respective one of said memory locations indicated by said first and second address data.

8. A video display control system according to claim 6, wherein said display control means further comprises second register means for receiving an image data, said memory accessing means further writing said image data received by said second register means into said remainder of said plurality of memory locations.

9. A video display control system according to claim 6 further comprising a central processing unit, wherein memory locations indicated by said first and second address data among said plurality of memory locations store a plurality of image data in advance and said display control means further comprises a second register, said memory accessing means reading each of said plurality of image data from said memory locations indicated by said first and second address data and storing each of the read plurality of image data into said second register, said central processing unit loading each of said plurality of image data stored in said register thereinto.

10. A video display control system according to claim 9, in which said image data is a color code representative of a color of a display element of said one of said display element group or groups in said display area, whereby said display area is colored using said color.

11. A video display control system according to claim 9, wherein each of said plurality of image data is a color code or codes representative of a color or colors of a display element or elements of a respective one of said display element group or groups in said display area.

12. A video display control system according to claim 6 further comprising a central processing unit for outputting a plurality of second image data each corresponding to a respective one of said display element group or groups in said display area on said screen, wherein memory locations indicated by said first an second address data among said plurality of memory locations store a plurality of first image data in advance and said display control means further comprises second register means storing each of said plurality of second image data and operation means, said memory accessing means further reading said plurality of first image data from said memory locations indicated by said first and second address data, said operation means effecting a certain operation on each of said plurality of first image data and a respective one of said plurality of second image data to output third image data represented by the result of said operation, said memory accessing means further writing said third image data into a corresponding one of said memory locations indicated by said first and second address data.

13. A video display control system according to claim 12, wherein each of said first, second and third image data is composed of a color code or codes identifying a color or colors of a display element or elements on said screen.

14. A video display control system according to claim 6, further comprising a central processing unit for outputting a plurality of image data each corresponding to a respective one of said display element group or groups in said display area on said screen, wherein said display control means further comprises second register means for storing each of said plurality of image data, said memory accessing means writing each of said plurality of image data stored in said second register into a corresponding one of said plurality of memory locations indicated by said first and second address data.

15. A video display control system according to claim 14, wherein each of said plurality of image data is composed of a color code or codes representative of a color or colors of a display element or elements of a representative one of said display element group or groups in said display area.

16. A video display control system according to claim 2, wherein said first memory location stores a first image data in advance and said display control means further comprises second register means for receiving a second image data, and operation means, said memory accessing means further reading said first image data from said first memory location indicated by said first address data, said operation means effecting a certain operation on said first and second image data to output third image data represented by the result of said operation, said memory accessing means further writing said third image data into said first memory location.

17. A video display control system according to claim 16, wherein each of said first, second and third image data is composed of a color code or color codes identifying a color or colors.

18. A video display control system according to claim 2, wherein said first memory location stores a first image data in advance and said display control means further comprises a second register, said memory accessing means reading said first image data from said first memory location and storing the read first image into said second register.

19. A video display contorl system according to claim 18, wherein said first image data is composed of a color code or codes representative of a color or colors of a display element or elements of a corresponding one of a display element group or groups in said display area.

20. A video display control system according to claim 2, wherein said memory accessing means reads a first image data from said first memory location, said display control means further comprising second register means for receiving a second image data and comparing means for comparing said first image data read from said memory location with said second image data stored in said second register means to output a comparison result, said memory accessing means further reading a third image data from one of said plurality of memory locations exclusive of the accessed memory location in accordance with said comparison result.

21. A video display control system according to claim 20, wherein said memory accessing means reading said third image data when said comparison result indicates a coincidence of said first image data with said second image data.

22. A video display control system according to claim 21, wherein said display control means further comprises flag register means responsive to said comparison result for outputting a flag when said comparison result indicates a noncoincidence of said first image data with said second image data.

23. A video display control system according to claim 21, wherein said display control means further comprising flag register means is responsive to said comparison result for outputting a flag when said comparison result indicates a coincidence of said first image data with said second image data.

24. A video display control system according to claim 20, wherein said accessing means reading said third image data when and comparison result indicates a non-coincidence of said first image data with said second image data.

25. A video display control system according to claim 24, wherein said area information further comprises fourth data indicative of directions of a pair of corners of said display area adjacent to said one corner with respect to said one corner.

26. A video display control system according to claim 2, wherein said area information comprises of first data representative of 1 of said display elements and a second data representative of another 1 of said display elements, said display elements forming a straight line lying between said 1 of the display elements and said another of the display elements.

27. A video display control system for displaying a video image on a screen of a video display unit which includes a plurality of display elements comprising:

(a) memory means, having a plurality of memory locations, each said memory location corresponding to a respective display element group, each said display element group including at least one of said plurality of dispaly elements on the screen; and (b) display control means having: (i) first register means for receiving area information identifying a display area that includes at least one of said dispaly element groups, (ii) address generating means for generating first address data indicative of a first memory location among said plurality of memory locations in said memory means, in accordance with said area information, said first memory location corresponding to one of a display element group or groups in said display area, wherein said address generating means further generates, in accordance with said area information, second address data indicative of the remainder of said plurality of memory locations, said memory accessing means further accessing the remainder of said plurality of memory locations in accordance with said second address data, and (iii) memory accessing means for accessing said first memory location in accordance with said first address data.

28. A video display control system according to claim 27, wherein said screen is composed of M columns and N rows of display elements, said display area defined by said area information being composed of X columns and Y rows of display elements, where $1 \leqq X \leqq M$ and $1 \leqq Y \leqq N$.

29. A video display control system according to claim 28, wherein said area information comprises first data indicative of column and row positions of a display element disposed at one corner of said display area, second data indicative of number of display elements on a row of display elements within said display area, and third data indicative of number of display elements on a column of display elements within said display area.

30. A video display control system according to claim 27, wherein said area information comprises a first data representative of one of said display elements and a second data representative of another one of said display elements, said display elements forming a straight line lying between said one of the display elements and said another one of the display elements.

31. A video display control system according to claim 27 further comprising a central processing unit for outputting a plurality of image data each corresponding to a respective one of said display element group or groups in said display area on said screen, wherein said display control means further comprises a second register for storing each of said plurality of image data, said memory accessing means writing each of said plurality of image data stored in said second register into a corresponding one of said plurality of memory locations indicated by said first and second address data.

32. A video display control system according to claim 31, wherein each of said plurality of image data is composed of a color code or codes representative of a color or colors of a display element or elements of a respective one of said display element group or groups in said display area.

33. A video display control system according to claim 27 further comprising a central processing unit for outputting a plurality of second image data each corresponding to a respective one of said display element group or groups in said display area on said screen, wherein memory locations indicated by said first and second address data among said plurality of memory locations store a plurality of first image data in advance and said display control means further comprises a second register for storing each of said plurality of second image data and operation means, said memory accessing means further reading said plurality of first image data from said memory locations indicated by said first and second address data, said operation means effecting a certain operation on each of said plurality of first image data and a respective one of said plurality of second image data to output third image data represented by the result of said operation, said memory accessing means further writing said third image data into a corresponding one of said memory locations indicated by said first and second address data.

34. A video display control system according to claim 33, wherein each of said first, second and third image data is composed of a color code or codes identifying a color or colors of a display element or elements on said screen.

35. A video display control system according to claim 27 further comprising a central processing unit, wherein memory locations indicated by said first and second address data among said plurality of memory locations store a plurality of image data in advance and said display control means further comprises a second register, said memory accessing means reading each of said plurality of image data from said memory locations indicated by said first and second address data and storing each of the read plurality of image data into said second register, said central processing unit loading each of said plurality of image data stored in said second register thereinto.

36. A video display control system according to claim 35, wherein each of said pluality of image data is a color code or codes representative of a color or colors of a display element or elements of a respective one of said display element group or groups in said display area.

37. A video display control system according to claim 27, wherein said display control means further comprises a second register for receiving an image data, said memory accessing means further writing said image data received by said second register into said remainder of said plurality of memory locations.

38. A video display control system according to claim 37, in which said image data is a color code representative of a color of a display element of said one of said display element group or groups in said display area, whereby said display area is painted out with said color.

39. A video display control system according to claim 27, wherein memory locations indicated by said first and second address data among said plurality of memory locations store a plurality of first image data in advance and said display control means further comprises a second register for receiving a second image data and operation means, said memory accessing means further reading each of said plurality of first image data from said memory locations indicated by said first and second address data, said operation means effecting a certain operation on each of said plurality of first image data and said second image data to output third image data represented by each result of said operations, said memory accessing means further writing each of said third image data into a respective one of said memory locations indicated by said first and second address data.

40. A video display control system for displaying a video image on a screen of a video display unit which includes a plurality of display elements comprising:

(a) memory means, having a plurality of memory locations, each said memory location corresponding to a respective display element group, each said display element group including at least one of said plurality of display elements on the screen; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, wherein said first memory location stores a first image data in advance and said display control means further comprises second register means for receiving a second image data, and operation means, said memory accessing means further reading said first image data from said first memory location indicated by said first address data, said operation means effecting a certain operation on said first and second image data to output third image data represented by the result of said operation, said memory accessing means further writing said third image data into said first memory location, and (iii) memory accessing means for accessing said first memory location in accordance with said first address data.

41. A video display control system according to claim 40, wherein each of said first, second and third image data is composed of a color code or color codes identifying a color or colors.

42. A video display control system for displaying a video image on a screen of a video display unit which includes a plurality of display elements comprising:

(a) memory means, having a plurality of memory locations, each said memory location corresponding to a respective display element group, each said display element group including at least one of said plurality of display elements on the screens; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, wherein said first memory location stores a first image data in advance and said display control means further comprises second register means, said memory accessing means reading said first image data from said first memory location and storing the read first image data into said second register means, and (iii) memory accessing means for accessing said first memory location in accordance with said first address data.

43. A video display control system according to claim 42, wherein said first image data is composed of a color code or codes representative of a color or colors of a display element or elements of a corresponding one of display element group of groups in said display area.

44. A video display control system for displaying a video image on a screen of a video display unit which includes a plurality of display elements comprising:

(a) memory means, having a plurality of memory locations, each said memory location corresponding to a respective display element group each said display element group including at least one of said plurality of display elements on the screen; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, (iii) memory accessing means for accessing said first memory location in accordance with said first address data, to read a first image data from said first memory location, (iv) second register means for receiving a second image data, and (v) comparing means for comparing said first image data read from said first memory location with said second image data stored in said second register means to output a comparison result, said memory accessing means further reading a third image data from one of said plurality of memory locations exclusive of the accessed memory location in accordance with said comparison result.

45. A video display control system according to claim 44, wherein said memory accessing means reading said third image data when said comparison result indicates a coicidence of said first image data with said second image data.

46. A video display control system according to claim 45, wherein said display control means further comprising flag register means responsive to said comparison result for outputting a flag when said comparison result indicates a noncoincidence of said first image data with said second image data.

47. A video display control system according to claim 44, wherein said accessing means reading said third image data when said comparison result indicates a non-coicidence of said first image data with said second image data.

48. A video display control system according to claim 47, wherein said display control means further comprising flag register means responsive to said comparison result for outputting a flag when said comparison result indicates a coincidence of said first image data with said second image data.

49. A video display control system for displaying a video image on a screen of a video display unit which includes a plurality of display elements comprising:

(a) memory means, having a plurality of memory locations, each said memory location corresponding to a respective display element group, each said display element group including at least one of said plurality of display elements on the screens; and (b) display control means having: (i) first register means for receiving area information identifying a display area that includes at least one of said display element groups, (ii) address generating means for generating first address data indicative of a first memory location among said plurality of memory locations in said memory means, in accorandce with said area information, said first memory location corresponding to one of a display element group or groups in said display area, wherein said screen is composed of M columns and N rows of display elements, said display area defined by said area information being composed of X columns and Y rows of display element where $1 \leqq X \leqq M$ and $1 \leqq Y \leqq N$, and said area information comprises first data indicative of column and row positions of a display element disposed at one corner of said display area, second data indicative of number of display elements on a row of display elements within said display area, and third data indicative of number of display elements on a comlumn of display elements within said display area, and (iii) memory accessing means for accessing said first memory location in accordance with said first address data.

50. A video display control system according to claim 49, wherein said area information further comprises fourth data indicative of directions of a pair of corners of said display area adjacent to said one corner with respect to said one corner.

51. A video display control system for displaying a video image on a screen of a video display unit which includes a plurality of display elements comprising:

(a) memory means, having a plurality of memory locations, each said memory location corresponding to a respective display element group, each said display element group including at least one of said plurality of display elements on the screen; and (b) display control means having: (i) first register means for receiving area information identifying a display area that includes at least one of said display element groups, (ii) address generating means for generating first address data indicative of a first memory location among said plurality of memory locations in said memory means, in accordance with said area information, said first memory location corresponding to one of a display element group or groups in said display area, wherein said area information comprises a first data representative of one of said display elements and a second data representative of another one of said dispaly elements, said display elements forming a straight line lying between said one of the display elements and said another one of the display elements, and (iii) memory accessing means for accessing said first memory location in accordance with said first address data.

52. A video display control according to claim 1 or claim 2, wherein said screen is composed of M columns and N rows of display elements, said display area defined by said area information being composed of X columns and Y rows of display elements, where 1≦X≦M and 1≦Y Y≦N.

* * * * *